US010832592B2

(12) United States Patent
Holder et al.

(10) Patent No.: US 10,832,592 B2
(45) Date of Patent: Nov. 10, 2020

(54) PILOT ASSESSMENT SYSTEM

(71) Applicant: The Boeing Company, Chicago, IL (US)

(72) Inventors: Barbara Elaine Holder, Seattle, WA (US); Craig R. Standley, Maple Valley, WA (US); Michael D. Chu, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 272 days.

(21) Appl. No.: 13/755,638

(22) Filed: Jan. 31, 2013

(65) Prior Publication Data

US 2014/0212847 A1    Jul. 31, 2014

(51) Int. Cl.
*G09B 19/16* (2006.01)

(52) U.S. Cl.
CPC .................. *G09B 19/165* (2013.01)

(58) Field of Classification Search
CPC .......... G09B 19/165; G09B 9/08; G09B 9/16; G06Q 10/06; G06Q 10/0639
USPC .......................................................... 434/35
See application file for complete search history.

(56) References Cited

U.S. PATENT DOCUMENTS

| 4,077,138 A * | 3/1978 | Foerst ...................... G09B 9/04 |
| | | 348/121 |
| 4,182,053 A * | 1/1980 | Allen ....................... G09B 9/05 |
| | | 345/419 |
| 4,464,117 A * | 8/1984 | Foerst ...................... G09B 9/04 |
| | | 434/67 |
| 5,075,881 A * | 12/1991 | Blomberg ........... G06F 17/5009 |
| | | 434/30 |
| 6,038,498 A * | 3/2000 | Briffe ..................... G01C 23/00 |
| | | 244/1 R |
| 6,053,737 A * | 4/2000 | Babbitt .................... G09B 9/08 |
| | | 434/29 |

(Continued)

FOREIGN PATENT DOCUMENTS

| CN | 1214783 A | 4/1999 |
| CN | 1521655 A | 8/2004 |

(Continued)

OTHER PUBLICATIONS

Orasanu et al. "Shared Problem Models and Flight Crew Performance", NASA 1994, Aviaiton Psychology in Practice, Aldershot, England, Ashgate Publishing Group, pp. 1-30.*

(Continued)

*Primary Examiner* — Xuan M Thai
*Assistant Examiner* — Sadaruz Zaman
(74) *Attorney, Agent, or Firm* — Yee & Associates, P.C.

(57) ABSTRACT

A method and apparatus for assessing performance in operating an aircraft. Information for assessing a performance of a group of operations performed by a number of crew members of the aircraft is displayed on a display system during operation of the aircraft by the number of crew members for which the group of operations is assessed. User input assessing the performance of the group of operations by the number of crew members is received through an input system. The user input is stored. A report on the performance of the group of operations performed by the number of crew members using the user input is generated.

20 Claims, 20 Drawing Sheets

(56) References Cited

U.S. PATENT DOCUMENTS

| | | | |
|---|---|---|---|
| 6,405,107 B1* | 6/2002 | Derman | G01C 23/005 340/3.5 |
| 6,782,346 B2* | 8/2004 | Bond | B64D 41/00 244/13 |
| 7,088,264 B2* | 8/2006 | Riley | 340/963 |
| 7,110,957 B2* | 9/2006 | Barnard | G06Q 10/06 705/7.15 |
| 7,376,497 B2* | 5/2008 | Chen | C05F 11/08 701/31.6 |
| 7,577,501 B2* | 8/2009 | Tafs | G07C 5/085 434/30 |
| 7,788,121 B1* | 8/2010 | Smith | G06Q 10/06316 705/7.26 |
| 7,979,192 B2* | 7/2011 | Morrison | F02D 41/22 701/31.9 |
| 8,352,057 B2* | 1/2013 | Schriever | G06Q 10/06 700/109 |
| 8,505,854 B2* | 8/2013 | Ishiba | B64C 13/10 244/194 |
| 2002/0106622 A1* | 8/2002 | Osborne | G09B 5/12 434/350 |
| 2004/0192329 A1* | 9/2004 | Barbosa | G06Q 10/06 455/456.1 |
| 2005/0057035 A1* | 3/2005 | Holder | B42D 1/009 281/15.1 |
| 2006/0014122 A1* | 1/2006 | Anderson et al. | 434/30 |
| 2006/0028012 A1* | 2/2006 | Holder | B42D 1/009 283/66.1 |
| 2006/0160049 A1* | 7/2006 | Zora | 434/29 |
| 2008/0154691 A1* | 6/2008 | Wellman | G06Q 10/06316 705/7.26 |
| 2009/0265119 A1* | 10/2009 | Bhattacharya | G06Q 10/06 702/34 |
| 2010/0092926 A1* | 4/2010 | Fabling | G09B 9/08 434/30 |
| 2010/0293454 A1* | 11/2010 | Holder et al. | 715/243 |
| 2011/0070567 A1* | 3/2011 | Linton | G09B 7/02 434/219 |
| 2011/0241902 A1 | 3/2011 | Shavit | |
| 2011/0131082 A1 | 6/2011 | Manser et al. | |
| 2011/0246001 A1* | 10/2011 | Shavit | G08G 5/0026 701/14 |
| 2011/0258021 A1* | 10/2011 | Mumaw | G06Q 10/06 705/7.38 |
| 2012/0156653 A1 | 6/2012 | Wokurka | |

FOREIGN PATENT DOCUMENTS

| | | |
|---|---|---|
| CN | 1926582 A | 3/2007 |
| JP | 2001500981 A | 1/2001 |
| JP | 2004077526 A | 3/2004 |
| JP | 2012071829 A | 4/2012 |

OTHER PUBLICATIONS

Orasanu, "Shared Problem Models and Flight Crew Performance", NASA 1994, Aviaiton Psychology in Practice, Aldershot, England, Ashgate Publishing Group, pp. 1-30.*

Baker et al., "A Gold Standards Approach to Training Instructors to Evaluate Crew Performance," Ames Research Center, National Aeronautics and Space Administration, Dec. 2003, 40 pages.

Baker, "CRM Assessment: Determining the Generalization of Rater Calibration Training," American Institute for Research, Sep. 2002, 55 pages.

Holder, "Airline Pilot Perceptions of Training Effectiveness," European Air Safety Seminar, Jul. 2012, 22 pages.

International Search Report and Written Opinion, dated Dec. 9, 2014, regarding Application No. PCT/US2013/067606, 8 pages.

International Search Report and Written Opinion, dated Aug. 4, 2015, regarding Application No. PCT/US2013/067606, 6 pages.

State Intellectual Property Office of PRC, Notification of Second Office Action, dated Mar. 19, 2018, regarding Application No. 201380072092.8, 5 pages.

intellectual Property Office of Great Britain Examination Report, dated Jul. 17, 2018, regarding Application No. GB1515235.8, 3 pages.

Japanese Office Action and English translation, dated Aug. 29, 2017, regarding Application No. 2015-555996, 6 pages.

State Intellectual Property Office of PRC Notification of Third Office Action with English Translation, dated Oct. 10, 2018, regarding Application No. 201380072092.8, 7 pages.

State Intellectual Property Office of PRC Notification of First Office Action and English Translation, dated May 31, 2017, regarding Application No. 201380072092.8, 28 pages.

Intellectual Property Office of Great Britain Examination Report, dated Jan. 9, 2018, regarding Application No. GB1515235.8, 6 pages.

* cited by examiner

1000

3:37 PM  100%

< Back australia

Welcome Guest
Line Check

Schedule — 1002

| Aircraft | A330 | B737 | EJET |

Date  04/10/2012  To  04/10/2012  [Set Date]  — 1004

Line Check Report Type

- ☑ ANNUAL LINE CHECK — 1006
- ☐ F/O CLEARANCE TO LINE CHECK — 1008
- ☐ CAPT CLEARANCE TO LINE CHECK — 1010
- ☐ 6 MONTH PROGRESS CHECK — 1012
- ☐ PROGRESS CHECK — 1014
- ☐ RE-CLEARANCE CHECK — 1016

| Type of Check | Student | Information | Report Items | Evaluation | Comments | Signatures | Summary |

*(Mobile device screen mockup)*

- Status bar: 3:39 PM, 100%
- Back
- australia | Welcome Guest / Line Check
- Student Name: Brandon

Support — 1202 — 1200

| Name | Employee # | ARN | Rank | Seat |
|------|-----------|-----|------|------|
| Christina | 2134 | 5332 | CAPT / FO | LH / RH |

Add

Route Schedule — 1204

Add Route

Route | Route Type

KSEA - KSFO | PF | PM/PNF | DAY | NIGHT

Approaches — 1206

- ☑ AUTOLAND
- ☐ CAT II
- ☐ CAT III
- ☐ DGA
- ☐ GLS
- ☐ ILS
- ☑ LLZ/VOR
- ☑ RNAV/GNSS
- ☐ RNAV/RNP
- ☑ VISUAL

Bottom tabs: Type of Check | Student | Information | Report Items | Evaluation | Comments | Signatures | Summary

FIG. 14

1700 australia  
Welcome Guest  
Line Check

| Student Name: Brandon | Export to PDF |

Line Check

Schedule

Aircraft              B737

Date     04/10/2012    To    04/10/2012

Line Check Report Type

ANNUAL LINE CHECK          X

F/O CLEARANCE TO LINE CHECK

CAPT CLEARANCE TO LINE CHECK

6 MONTH PROGRESS CHECK

PROGRESS CHECK

RE-CLEARANCE CHECK

Students

Name:      Brandon       Rank: FO  
Employee #:   5344  
ARN #        2221          Seat: RH

Assessors

Name:      Sam           Rank: CC

| Type of Check | Student | Information | Report Items | Evaluation | Comments | Signatures | Summary |

FIG. 17

Evaluation Summary

Jane Carol | Anil John | Christina Jenson | Jerry Brewer

1902 — PRE-FLIGHT
- Rating: 5
- Reps: 5
- Reasons: PY
- Prof: YES
- Final Rating: 5
- Notes:

1904 — ENG START
- Rating: 4
- Reps: 4
- Reasons: PD
- Prof: YES
- Final Rating: 5
- Notes:

1906 — ELEC GEN DRIVE L2
- Rating: 5
- Reps: 4
- Reasons: PD
- Prof: YES
- Final Rating: 5
- Notes:

1908 — LIQUID COOLING R
- Rating: 5
- Reps: 5
- Reasons: PY
- Prof: NO
- Final Rating: 1
- Notes:

1910 — LDA Z 22 *INCOMPLETE*
- Rating:
- Reps:
- Reasons:
- Prof:
- Final Rating:

1912 — ILS 22 *INCOMPLETE*
- Rating:
- Reps:
- Reasons:
- Prof:
- Final Rating:

Info | Flight Profile | Eval Summary

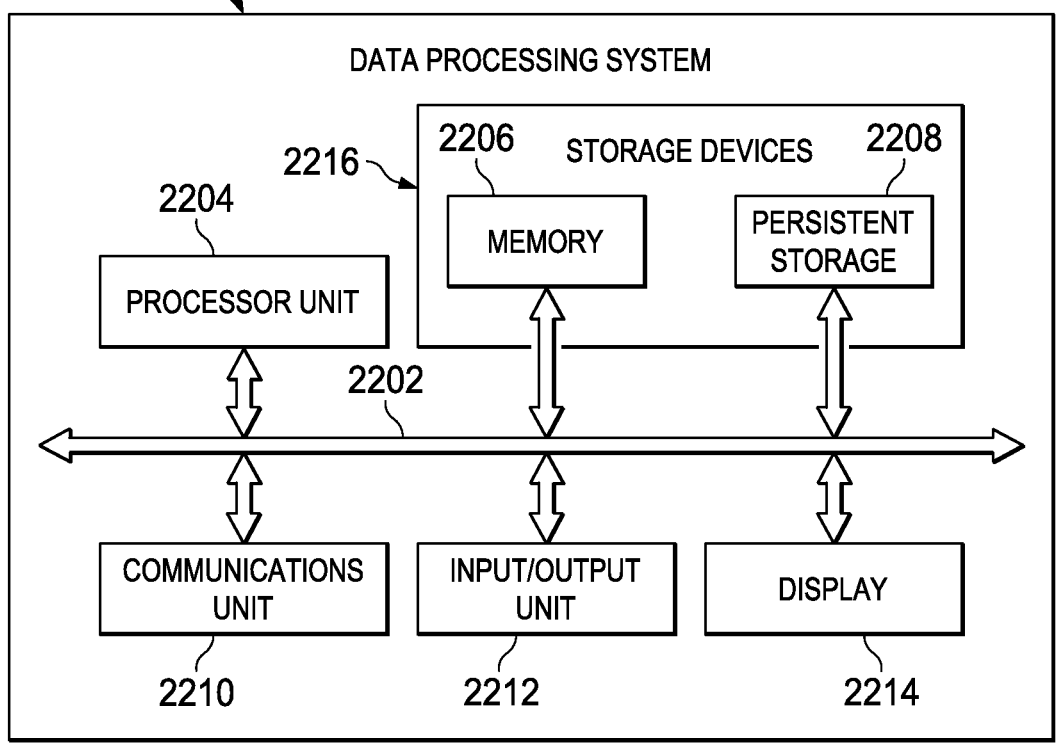
FIG. 22
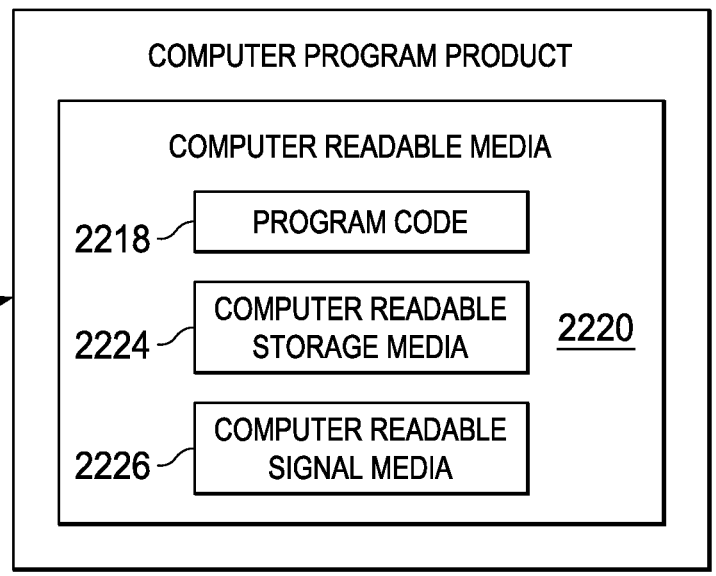

PILOT ASSESSMENT SYSTEM

BACKGROUND INFORMATION

1. Field

The present disclosure relates generally to aircraft and in particular to operating aircraft. Still more particularly, the present disclosure relates to a method and apparatus for assessing the performance of operations during the flight in aircraft.

2. Background

Pilots undergo flight training to obtain knowledge and experience to fly aircraft. The training may include classroom training, training and simulators, and actual flight experience. As part of the training, tests are taken to assess the level of proficiency of a pilot in forming different operations in operating an aircraft.

The tests take various forms. For example, knowledge tests and practical tests may be given. A knowledge test is also referred to as a written test and tests the pilot's knowledge about different aspects of operating aircraft.

Practical tests may involve an instructor accompanying the pilot on a flight of an aircraft. This flight may be performed in a simulator, an actual aircraft, or both.

Even after training, assessments of a pilot also may be made periodically. For example, a flight review may be made for a pilot that has a certificate issued by the Federal Aviation Administration (FAA). The flight reviews may be performed to assess the pilot's proficiency in operating an aircraft in a manner that meets various rules and regulations.

Currently, in making pilot assessments, evaluators use a paper-based process for assessing the performance of a pilot. The forms used in this process may be filled out by the person making the assessment after viewing the performance of the pilot and operating an aircraft.

With the use of paper forms, using an incorrect or out of date form results in the evaluator making an invalid assessment. As a result, another session with the pilot is required to observe the performance of the pilot and make a proper assessment with the proper form. This situation results in more time and expense to perform an assessment of the pilot than desired. Further, paper forms are also difficult to use, expensive, prone to errors, and time-consuming.

Therefore, it would be desirable to have a method and apparatus that takes into account at least some of the issues discussed above, as well as other possible issues.

SUMMARY

In one illustrative embodiment, an apparatus comprises a display system, an input system, and a flight assessor. The flight assessor is configured to display information for assessing a performance of a group of operations performed by a number of crew members of an aircraft on the display system during operation of the aircraft by the number of crew members for which the group of operations is assessed. The flight assessor is further configured to receive user input assessing the performance of the group of operations by the number of crew members through the input system.

In another illustrative embodiment, a method for assessing performance in operating an aircraft is provided. Information for assessing a performance of a group of operations performed by a number of crew members of the aircraft is displayed on a display system during operation of the aircraft by the number of crew members for which the group of operations is assessed. User input assessing the performance of the group of operations by the number of crew members is received through an input system. The user input is stored. A report on the performance of the group of operations performed by the number of crew members using the user input is generated.

In yet another illustrative embodiment, a flight assessment system comprises an assessment manager and a flight assessor. The assessment manager is configured to identify information for assessing a performance of a group of operations performed by a number of crew members. The flight assessor is configured to receive the information from the assessment manager; display the information for assessing the performance of the group of operations performed by the number of crew members of an aircraft on the display system during operation of the aircraft by the number of crew members for which the group of operations is assessed; and receive user input assessing the performance of the group of operations by the number of crew members through the input system.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 10 is an illustration of a test screen in accordance with an illustrative embodiment;

FIG. 12 is an illustration of an information screen in accordance with an illustrative embodiment;

FIG. 14 is an illustration of an operation assessment screen in accordance with an illustrative embodiment;

FIG. 17 is an illustration of a summary screen in accordance with an illustrative embodiment;

FIG. 19 is an illustration of a history screen in accordance with an illustrative embodiment;

FIG. 20 is an illustration of an assessment screen in accordance with an illustrative embodiment;

FIG. 22 is an illustration of a block diagram of a data processing system in accordance with an illustrative embodiment.

DETAILED DESCRIPTION

Illustrative embodiments recognize and take into account one or more different considerations. For example, the illustrative embodiments recognize and take into account that in addition to being cumbersome, time-consuming, and error-prone, currently used forms for making pilot assessments may be made more efficient by placing them in an electronic form for use in a device such as a computer.

Those embodiments also recognize and take into account that even with electronic forms, the current process for assessing pilot performance may still be more difficult than desired. For example, the illustrative embodiments recognize and take into account that currently used forms do not provide a desired level in the standardization of grading practices when making assessments of pilot performance.

As another example, the illustrative embodiments recognize and take into account that currently used forms are optimized for data entry rather than assessing pilot performance. With currently used forms, an evaluator may be required to jump between sections. The situation may lead to missing items during grading and may lead to errors in grading. Further, with the currently used process, a physical form is turned in and entered into a system for use.

The illustrative embodiments provide a method and apparatus for assessing the performance of a number of crew members operating an aircraft. In these illustrative examples, an apparatus includes a display system, an input system, and a flight assessor. The flight assessor is configured to display information for assessing the performance of a group of operations performed by a number of crew members of the aircraft on the display system during operation of the aircraft by the number of crew members for which the group of operations is assessed. The flight assessor receives user inputs assessing the performance of the group of operations by the number of crew members through the input system.

In these illustrative examples, the use of a "number of" or a "group of" with reference to items means one or more items. For example, a number of crew members is one or more crew members. In yet another example, a group of operations is one or more operations.

Figure 1:
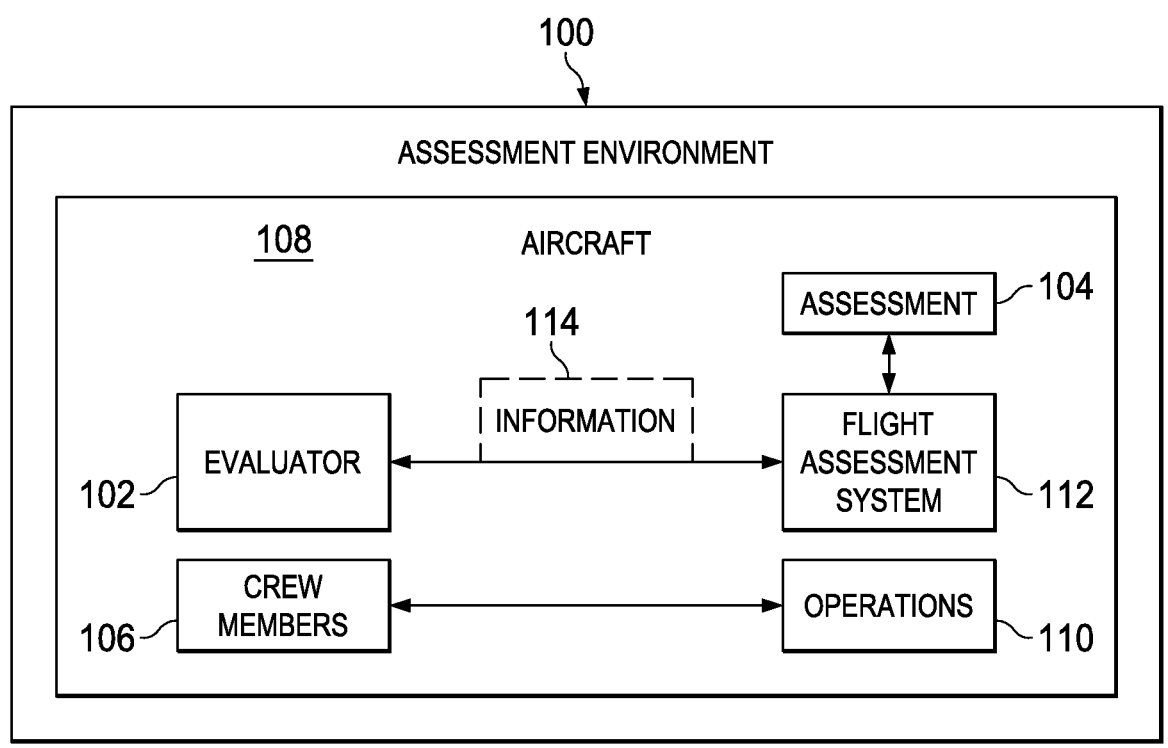
FIG. 1 is an illustration of a block diagram of an assessment environment in accordance with an illustrative embodiment.

With reference now to figures and in particular with reference to FIG. 1, an illustration of a block diagram of an assessment environment is depicted in accordance with an illustrative embodiment. In this illustrative example, in assessment environment 100, evaluator 102 performs assessment 104 of a number of crew members 106 that operate aircraft 108.

As depicted, assessment 104 may be made by evaluator 102 for a group of operations 110 performed by the number of crew members 106 while operating aircraft 108. The group of operations 110 performed by the number of crew members 106 may include operations performed when aircraft 108 is in a number of different states. For example, the group of operations may be performed when aircraft 108 is at least one of stationary on the ground, moving on the ground, taking off, landing, level flight, and in other states.

As used herein, the phrase "at least one of," when used with a list of items, means different combinations of one or more of the listed items may be used and only one of each item in the list may be needed. For example, "at least one of item A, item B, and item C" may include, without limitation, item A or item A and item B. This example also may include item A, item B, and item C or item B and item C. In other examples, "at least one of" may be, for example, without limitation, two of item A, one of item B, and ten of item C; four of item B and seven of item C; and other suitable combinations.

Evaluator 102 performs assessment 104 through observing the number of crew members 106 performing the group of operations 110. In these illustrative examples, evaluator 102 performs assessment 104 of number of crew members 106 using flight assessment system 112. As depicted, flight assessment system 112 is a hardware system and may include software.

As depicted, flight assessment system 112 may display information 114 to evaluator 102 while the number of crew members 106 performs the group of operations 110 during operation of aircraft 108. This display of information may occur when aircraft 108 is in one or more different states. The display of information 114 may be used by evaluator 102 for making assessment 104 of the performance of the number of crew members 106.

In particular, information 114 may be such that assessment 104 may be performed in a desired manner by evaluator 102. For example, information 114 may be selected such that assessment 104 is standardized for the number of crew members 106 as well as other crew members for which assessments may be performed.

Figure 2:
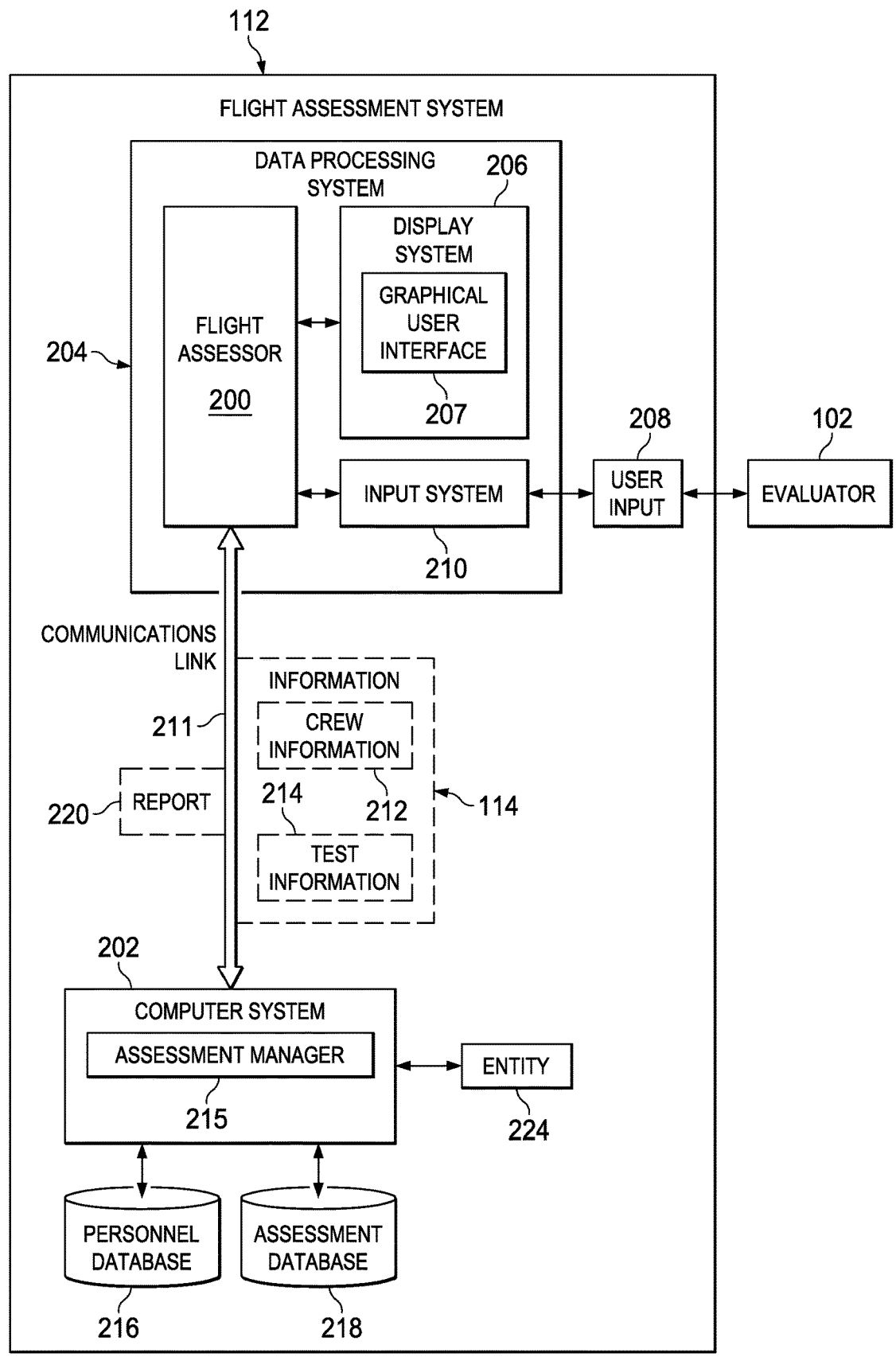
FIG. 2 is an illustration of a flight assessment system in accordance with an illustrative embodiment.

Turning now to FIG. 2, an illustration of a flight assessment system is depicted in accordance with an illustrative embodiment. In this figure, an example of one implementation for flight assessment system 112 is shown.

In this illustrative example, flight assessment system 112 includes a number of different components. As depicted, flight assessment system 112 includes flight assessor 200 and computer system 202.

As depicted, flight assessor 200 is a component used by evaluator 102 in FIG. 1. Flight assessor 200 may be located in aircraft 108 during the time when evaluator 102 performs assessment 104 of crew members 106 performing operations 110. In these different illustrative examples, flight assessor 200 may be implemented in software, hardware, firmware or a combination thereof. When software is used, the operations performed by flight assessment system 112 may be implemented in program code configured to run on a processor unit. When firmware is used, the operations performed by flight assessment system 112 may be implemented in program code and data and stored in persistent memory to run on a processor unit. When hardware is employed, the hardware may include circuits that operate to perform the operations in flight assessor 200.

In these illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being. For example, the processes may be implemented as circuits in organic semiconductors.

In the illustrative example, flight assessor 200 may be implemented in data processing system 204. Data processing system 204 may be implemented in a number of different ways. In one illustrative example, data processing system 204 may be a portable data processing system. In this manner, evaluator 102 may carry data processing system 204 onto aircraft 108. For example, data processing system 204 may be implemented as a tablet computer, a mobile phone, a laptop computer, an electronic flight bag (EFB), or in some other suitable form.

As depicted, flight assessor 200 is configured to display information 114 for assessing the performance of the group of operations 110 performed by the number of crew members 106 of aircraft 108 on display system 206 in this illustrative example. In particular, information 114 may be displayed on graphical user interface 207 on display system 206.

Display system 206 is a hardware system and includes one or more display devices. For example, display system 206 may include at least one of a liquid crystal display, a light emitting diode display, a plasma display, and other suitable types of display devices.

Evaluator 102 may perform assessment 104 while viewing information 114 displayed on graphical user interface 207 on display system 206. Further, in performing the assessment 104, evaluator 102 may enter user input 208 into flight assessor 200 via input system 210. Input system 210 is a hardware system and includes one or more input devices. For example, input system 210 may include at least one of a mouse, a keyboard, a trackball, a joystick, a button, a touchscreen, and other suitable types of devices.

In one illustrative example, display system 206 and input system 210 may be integrated with each other. For example, display system 206 and input system 210 may take the form of a touchscreen device in data processing system 204.

Information 114 may be sent to flight assessor 200 before assessment 104 is performed. In another example, an update to information 114 may be received by flight assessor 200 prior to or as assessment 104 is performed. Information 114 may be received from assessment manager 215 in computer system 202 in the illustrative example. As depicted, information 114 may be sent over communications link 211. In these illustrative examples, communications link 211 is a wireless communication link.

In this illustrative example, computer system 202 is one or more computers. When more than one computer is present in computer system 202, those computers may communicate with each other over a communications medium such as a network.

Assessment manager 215 in computer system 202 may identify crew information 212 and test information 214 for information 114. Crew information 212 may be identified by computer system 202 using personnel database 216. Test information 214 may be identified by assessment manager 215 using assessment database 218. In this illustrative example, crew information 212 is information about the number of crew members 106 for which assessment 104 is to be made.

Assessment manager 215 is configured to send information 114 to flight assessor 200 over communications link 211. In these illustrative examples, assessment manager 215 may send information 114 in response to requests, push information 114, or some combination thereof. When information 114 is pushed without a request from flight assessor 200, information 114 may be sent when updates occur in at least one of personnel database 216 and assessment database 218 in which the updates may be needed by flight assessor 200 to perform assessment 104.

As depicted, test information 214 is information used to identify the group of operations 110 that is to be assessed by evaluator 102. Additionally, test information 214 also may include standards by which assessment 104 should be made.

In these illustrative examples, test information 214 may be based on a number of different factors. In these illustrative examples, test information 214 may be based on at least one of the type of aircraft, the airline, the manufacturer of an aircraft, the country, and other suitable information.

With test information 214, assessment 104 may be performed for the number of crew members 106 on a standardized basis as compared to assessments made for other crew members. In other words, test information 214 may be used to more objectively generate assessment 104 in a manner that standardizes assessment 104 and reduces errors in assessment 104.

When assessment 104 is completed, report 220 may be generated by flight assessor 200. In the depicted examples, report 220 is an electronic report. Additionally, report 220 may be signed by at least one of evaluator 102 and the number of crew members 106.

Flight assessor 200 sends report 220 to computer system 202 over communications link 211. Report 220 may then be sent to entity 224 for use. Entity 224 may be, for example, an airline, a training facility, a federal agency, the pilots union, or some other suitable entity. In these illustrative examples, report 220 also may be used to update crew information 212 to provide a history of testing for the number of crew members 106.

Thus, with the use of flight assessment system 112 and in particular, flight assessor 200, evaluator 102 may perform assessment 104 of the number of crew members 106 in real time while the number of crew members 106 perform the group of operations 110 during the operation of aircraft 108. Further, the display of information 114 by flight assessor 200 may allow for a desired assessment of number of crew members 106 in generating assessment 104 of the number of crew members 106. For example, assessment 104 may be made using at least one of guidelines, grading scales, instructions, and suitable types of information.

Figure 3:
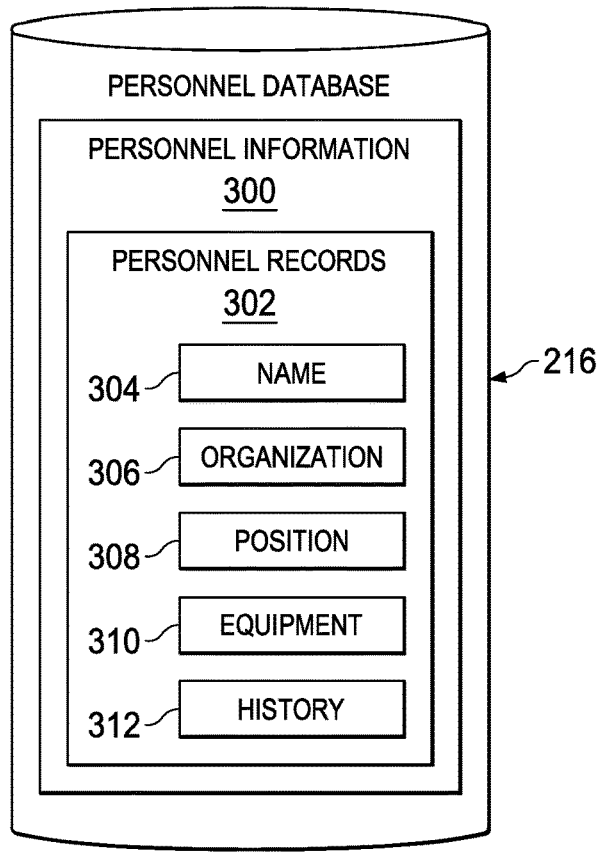
FIG. 3 is an illustration of a personnel database in accordance with an illustrative embodiment.

Turning now to FIG. 3, an illustration of a personnel database is depicted in accordance with an illustrative embodiment. As depicted, one implementation for personnel database 216 is shown.

In this illustrative example, personnel database 216 includes personnel information 300. As depicted, personnel information 300 in personnel records 302 includes name 304, organization 306, position 308, equipment 310, and history 312.

Name 304 is the name of the crew member. Organization 306 may be, for example, the airline that employs the crew member. Position 308 is the position of the crew member in the organization. For example, the position may be captain, copilot, or some other suitable title. Equipment 310 may be, for example, the type of aircraft that the person operates.

History 312 may include prior assessments for a person. For example, history 312 may include scores, comments, and other information from prior assessments.

Figure 4:
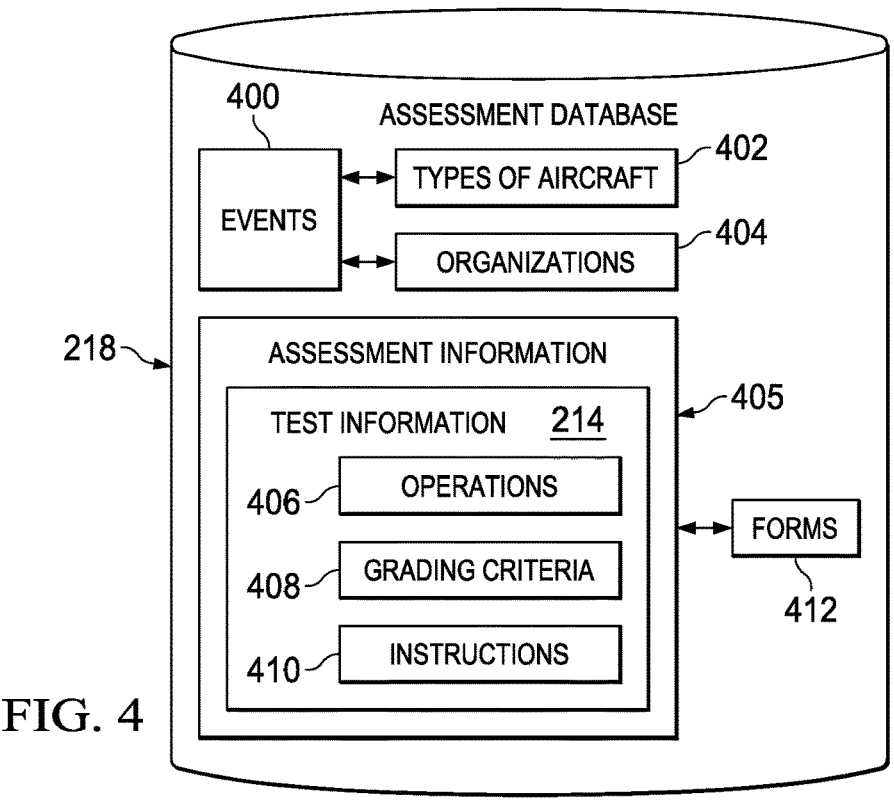
FIG. 4 is an illustration of an assessment database in accordance with an illustrative embodiment.

With reference next to FIG. 4, an illustration of an assessment database is depicted in accordance with an illustrative embodiment. An example of one implementation for assessment database 218 is shown in this figure.

As depicted, assessment database 218 includes information for use in generating test information 214. For example, assessment database 218 may include events 400 for which assessments are to be made. The selection of events 400 may be based on at least one of types of aircraft 402 and organizations 404.

An event in events 400 is an occurrence or happening for which assessment 104 is to be made, which may take various forms. For example, an event may be selected from at least one of a preflight check, engine start, moving away from the gate, taxiing, takeoff, extent, descent, landing, engine shutdown, and other suitable events. Other events also include at least one of encountering turbulence, receiving a turbulence warning, receiving rerouting instructions, undesired performance of an engine, and other suitable types of events that may occur during the operation of aircraft 108.

The type of aircraft in types of aircraft 402 may be, for example, a commercial aircraft, a military aircraft, or some other suitable types of aircraft. Further, types of aircraft 402 also may be based on the manufacturer and model of the aircraft. In some cases, the type of aircraft may even be more specific and be based on an account number for the aircraft.

As depicted, organizations 404 may take a number of different forms. For example, organizations 404 may include at least one of an airline, a training facility, a government entity, or some other suitable type of organization.

Based on a selection of at least one of an event from events 400, a type of aircraft from types of aircraft 402, and an organization from organizations 404, test information 214 may be selected from assessment information 405. In these illustrative examples, test information 214 may include at least one of a group of operations 406, grading criteria 408, instructions 410, and other suitable types of information for an event in events 400.

The group of operations 406 identifies one or more operations for which assessment 104 is to be made. In these illustrative examples, an operation is an action that may be performed by a crew member in response to an event that may occur.

In the illustrative example, grading criteria 408 provides information used to generate grades or scores for assessment 104. Grading criteria 408 is used to provide a more standardized scoring of group of operations 110 performed by number of crew members 106 with respect to other crew members who may perform the same group of operations.

Instructions 410 may provide information for evaluator 102 to perform assessment 104. For example, instructions 410 may provide an identification of what actions evaluator 102 should look for in performing assessment 104. As another example, instructions 410 may identify which crew member should be performing which operations in group of operations 406 for the event, and other suitable information.

In these illustrative examples, assessment information 405 may be organized as forms 412. These forms may be stored in various formats. For example, forms 412 may be stored as extensible markup language (XML) documents, hypertext markup language (HTML) documents, or in some other suitable format.

Forms 412 may be created by an airline, instruction facility, or some other entity. These forms may be updated in assessment database 218. Updates to forms 412 may then be sent to flight assessor 200 in FIG. 2 for use in performing assessment 104.

Updates to forms 412 may take various forms. For example, the updates may be the format, organization, content, and other parts of forms 412.

As depicted, these updates are sent by assessment manager 215 to flight assessor 200. These changes may be made dynamically without requiring a request from flight assessor 200 to receive the information in one illustrative example.

The illustration of assessment environment 100 and the different components in assessment environment 100 in FIGS. 1-4 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, flight assessor 200 may be implemented within a computer system on aircraft 108 rather than being carried onto the aircraft 108. In these illustrative examples, flight assessor 200 may take the form of software that is transmitted to aircraft 108 over communications link 211.

Figure 5:
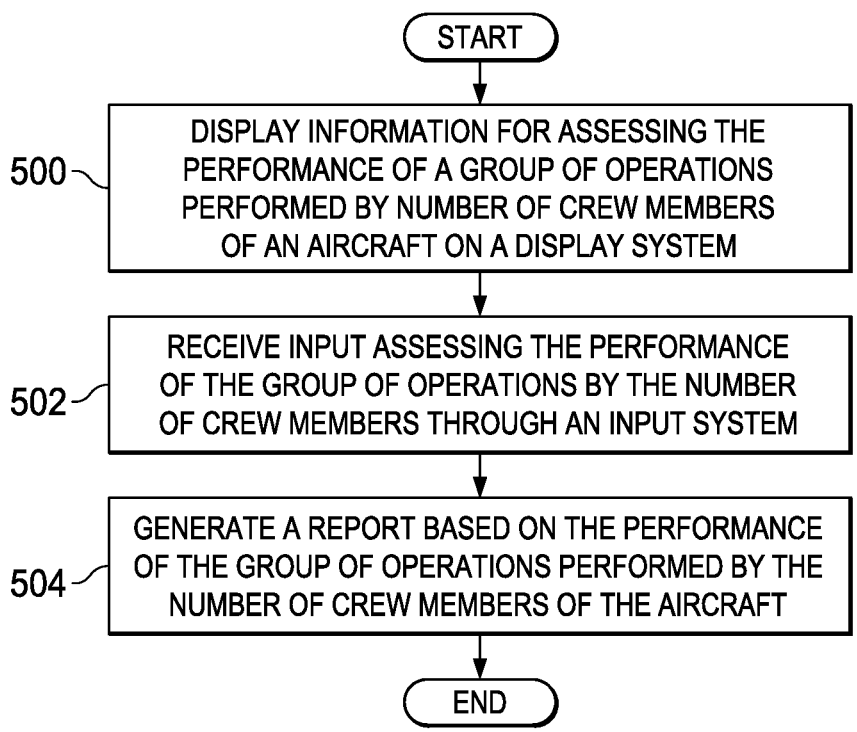
FIG. 5 is an illustration of a high-level flowchart of a process for assessing performance of crew members in operating an aircraft in accordance with an illustrative embodiment.

Turning now to FIG. 5, an illustration of a high-level flowchart of a process for assessing performance of crew members in operating an aircraft is depicted in accordance with an illustrative embodiment. The different operations illustrated in FIG. 5 are examples of operations that may be implemented using flight assessor 200 in FIG. 2.

The process begins by displaying information for assessing the performance of a group of operations performed by number of crew members of an aircraft on a display system (operation 500). In this illustrative example, the information is displayed during operation of the aircraft by the number of crew members for which the group of operations is assessed.

Input assessing the performance of the group of operations by the number of crew members is received through an input system (operation 502). A report is then generated based on the performance of the group of operations performed by the number of crew members of the aircraft (operation 504), with the process terminating thereafter.

Figure 6:
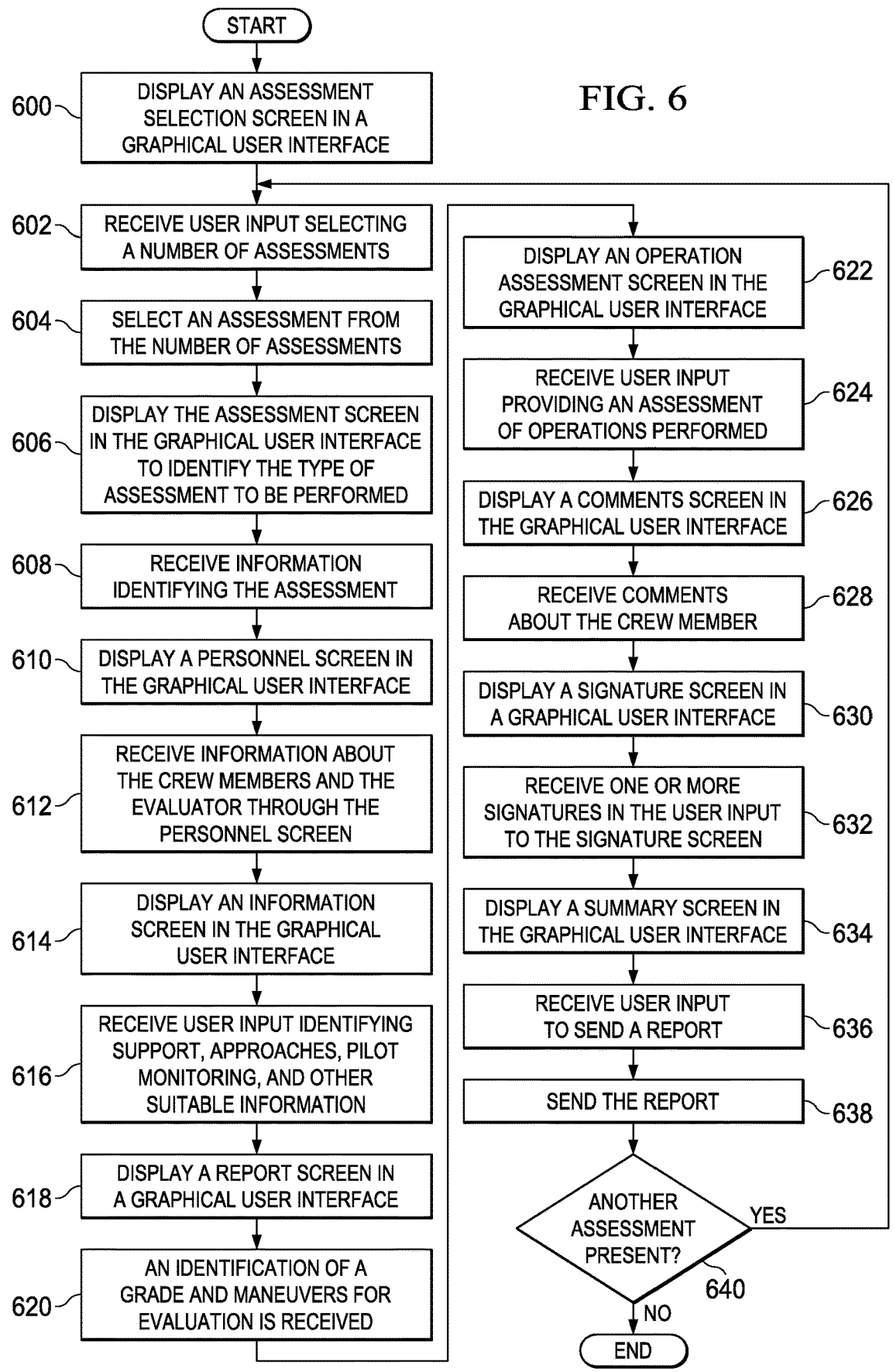
FIG. 6 is an illustration of a flowchart of a process for displaying a graphical user interface for performing an assessment of a number of crew members in accordance with an illustrative embodiment.

With reference now to FIG. 6, an illustration of a flowchart of a process for displaying a graphical user interface for performing an assessment of a number of crew members is depicted in accordance with an illustrative embodiment. The different operations illustrated in this example may be displayed on graphical user interface 207 in display system 206 by flight assessor 200 in FIG. 2.

The process begins by displaying an assessment selection screen in a graphical user interface (operation 600). This screen, when displayed in a graphical user interface, allows an evaluator one or more different assessments. These different selections may be used to perform assessments for a number of crew members. The assessments may be performed in a simulator, an actual aircraft, or some combination thereof. In other words, one assessment may be performed in a simulator for an aircraft while another assessment may be performed in the aircraft itself.

The process then receives user input selecting a number of assessments (operation 602). An assessment is selected from the number of assessments (operation 604).

An assessment screen is displayed in the graphical user interface to identify the type of assessment to be performed (operation 606). Information identifying the assessment is received (operation 608). If the assessment is performed in an aircraft, the information may include a schedule, the type of line check, and other suitable information. The schedule may be a particular flight, which may be used to identify the type of aircraft that is to be flown. If the assessment is performed using a simulator, the information may include an identification of an aircraft, a date, location, and other suitable information.

The process then displays a personnel screen in the graphical user interface (operation 610). The process then receives information about the crew members and the evaluator through the personnel screen (operation 612). Next, the process displays an information screen in the graphical user interface (operation 614). In operation 614, the information screen is configured to display information from personnel database 216. This screen may show the information, such as, for example, personnel for assessment, the date, and other information about the personnel being evaluated for the assessment.

User input is received identifying support, approaches, pilot monitoring, and other suitable information (operation 616). Information input in operation 616 is used to identify the person or persons being assessed.

A report screen is displayed in a graphical user interface (operation 618). The report screen provides an ability to select tasks for evaluation. For each task, a group of operations is performed to complete the task. The evaluation may be an assessment of the manner in which the task or tasks are performed by one or more crew members. In these illustrative examples, an assessment may be made for one task or multiple tasks depending on the particular implementation. The assessment may be made for multiple tasks if those tasks are considered related enough to each other. In other cases, the assessment may be made for multiple tasks based on the design of the form for performing an assessment by an entity. The selection of tasks for the assessment may be performed in this operation.

An identification of a grade and maneuvers for evaluation is received (operation 620). In operation 620, information about the operations to be performed are received. For example, the information may include the maneuvers to be performed by a pilot, as well as an indication of grades to be entered for the performance of the pilot also may be received in this operation. Next, an operation assessment screen is displayed in the graphical user interface (operation 622). The screen provides the evaluator an ability to input scores for different operations that may be performed for a task.

User input is received providing an assessment of operations performed (operation 624). The user input may take the form of scores for the different operations that are evaluated in the assessment of a crew member.

The process then displays a comments screen in the graphical user interface (operation 626). The comments screen allows the evaluator to enter more information about a performance of the crew member. The process then receives comments about the crew member (operation 628). In some cases, the user input may be no comment being made about the crew member.

A signature screen is displayed in a graphical user interface (operation 630). One or more signatures are then received in the user input to the signature screen (operation 632).

Thereafter, the process displays a summary screen in the graphical user interface (operation 634). User input is received to send a report (operation 636). The process then sends the report (operation 638).

Next, a determination is made as to whether another assessment is present that has not yet been evaluated to form an assessment of performance (operation 640). If another assessment is present, the process returns to operation 602 as described above. Otherwise, the process terminates.

The identification of information in the different operations in FIG. 6 may be made in a number of different ways. For example, information may be identified by user input inputting information into fields. In other examples, information may be identified through a selection of information from a list displayed on the screen.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

Figure 7:
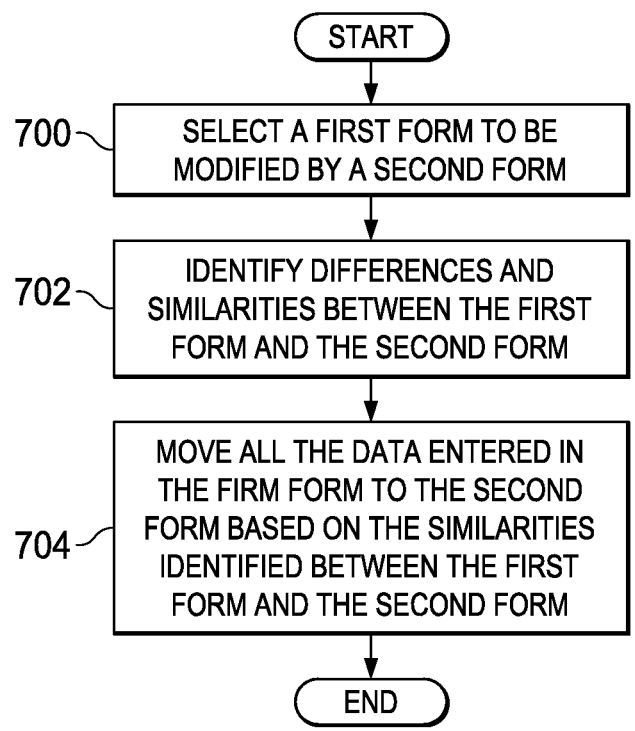
FIG. 7 is an illustration of a flowchart of a process for updating forms in accordance with an illustrative embodiment.

Turning now to FIG. 7, an illustration of a flowchart of a process for updating forms is depicted in accordance with an illustrative embodiment. The process illustrated in FIG. 7 may be implemented when updating forms 412 in assessment database 218 in FIG. 4. In particular, this process may be implemented by assessment manager 215 in FIG. 2 to dynamically replace a first form with a second form in forms 412 while the first form is in use.

The process begins by selecting a first form to be modified by a second form (operation 700). The first form may be an existing form in forms 412 in assessment database 218. The second form may be an updated form or new form created by an airline, instruction facility, or some other suitable entity.

Next, the process identifies differences and similarities between the first form and the second form (operation 702). In these illustrative examples, the similarities between the forms include information that is the same between the first form and the second form. The differences between the forms may comprise information that was not required in the first form but is now required in the second form.

Based on the similarities identified between the first form and the second form, the process then moves all data entered in the first form to the second form (operation 704), with the process terminating thereafter. During operation 704, the process may take into account changes in formatting of the data between the two forms.

In this manner, one or more forms 412 in assessment database 218 may be updated. With the use of an illustrative embodiment, forms 412 may be dynamically replaced with updated forms while forms 412 are in use by an evaluator or other entity.

Figure 8:
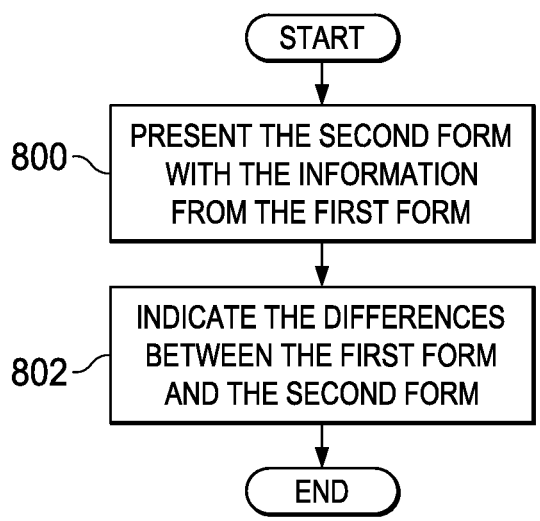
FIG. 8 is an illustration of a flowchart of a process for displaying an updated form in accordance with an illustrative embodiment.

With reference now to FIG. 8, an illustration of a flowchart of a process for displaying an updated form is depicted in accordance with an illustrative embodiment. The process illustrated in FIG. 8 may be implemented by flight assessor 200 in FIG. 2 when a form in forms 412 has been updated or replaced using the process illustrated in FIG. 7. In particular, the process shown in this figure may be implemented by flight assessor 200 using graphical user interface 207 in display system 206 in FIG. 2.

The process begins by presenting the second form with the information from the first form (operation 800). In these illustrative examples, the second form is the updated form modified by the process described in FIG. 7. The first form is the form that has been modified by the second form.

Next, the process indicates the differences between the first form and the second form (operation 802). In these depicted examples, the indication of the differences between forms may be displayed in a number of different ways. For example, differences may be highlighted in graphical user interface 207.

In other illustrative examples, a drop-down list of differences may be shown on graphical user interface 207. In this instance, an evaluator may select a particular difference in the list of differences and flight assessor 200 may direct the evaluator to a page in the second form that requires additional input or action. For example, when a second form includes a new field not included in the first form, an indication that the new field is present may appear on the list of differences displayed on graphical user interface 207. The evaluator may then select the new field and flight assessor 200 may guide the evaluator to the corresponding field such that the evaluator may enter the input needed by that field.

In still other illustrative examples, an icon may be presented on graphical user interface 207 such that the evaluator knows that the information contained in the field corresponding to the icon is different information than the information contained in the first form. For example, a red flag may be displayed on graphical user interface 207 next to a new field in the second form. In this case, the evaluator may select the flag and text may appear giving instructions for the type of input required.

In yet other illustrative examples, differences and similarities between forms may be indicated by using different types of text. For example, similar fields may be denoted by italicized text while new or different fields may be indicated by bold text. Of course, differences between the first form and the second form may be displayed in another suitable manner, depending on the particular implementation.

In this manner, an evaluator may see differences and similarities between the first form and the second form in graphical user interface 207. Further, the evaluator may be directed to fields where new information is required. As a result, with the use of an illustrative embodiment, the evaluator may receive the most up-to-date form to complete assessments.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, in FIG. 6, a summary may not always be sent when a summary screen is displayed in the graphical user interface. Instead, the summary may be stored and sent at a later time. In some cases, the summary may be deleted if the particular task is to be repeated for some reason.

As another example, a sequence of screens has been described in the different operations in FIG. 6. The operations displaying sequence of screens may be interrupted in some cases. For example, the process may be interrupted if the assessment is canceled or an event occurs in which the assessment being made is no longer applicable.

As another illustrative example, some operations may be performed in a different order. For example, the signature screen displayed in operation 630 may be performed after the display of the summary screen in operation 634.

With reference now to FIGS. 9-17, illustrations of screens that may be displayed in a graphical user interface are depicted in accordance with an illustrative embodiment. The different screens illustrated in these figures are examples of screens that may be displayed in the graphical user interface 207 on display system 206 by flight assessor 200. Further, these screens are examples of screens that may be displayed in the different operations described with respect to the flowchart in FIG. 6. The order of the screens depicted in FIGS. 9-17 aid evaluator 102 in FIG. 1 in properly assessing crew members during a number of different tasks. As a result, a more uniform process for assessment may be realized using an illustrative embodiment.

Figure 9:
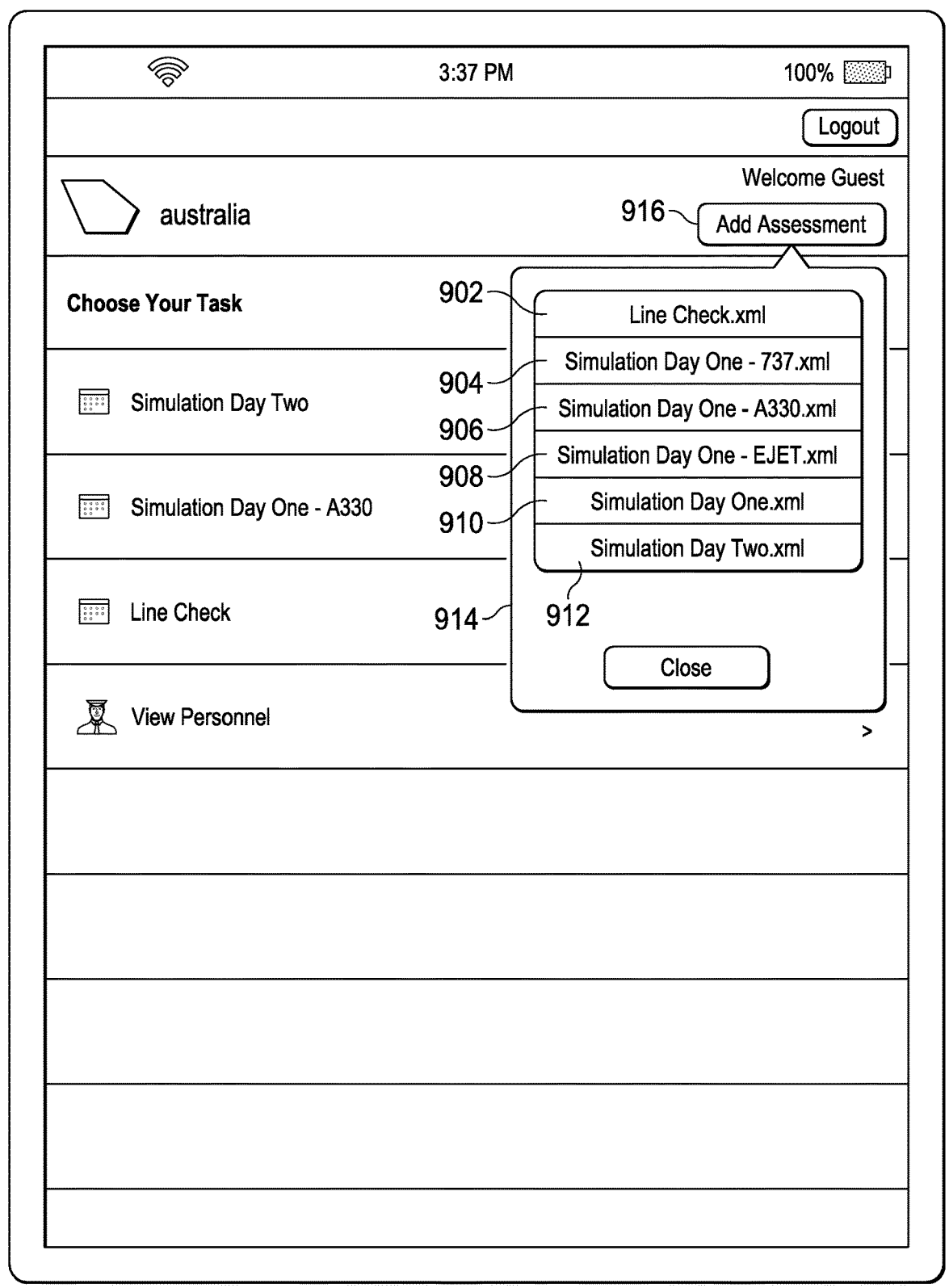
FIG. 9 is an illustration of a task selection screen in accordance with an illustrative embodiment.

In reference now to FIG. 9, an illustration of a task selection screen is depicted in accordance with an illustrative embodiment. In this example, assessment selection screen 900 is an example of a screen displayed in operation 600 in FIG. 6.

Assessment selection screen 900 is configured to receive user input to select assessments to be performed by evaluator 102 in FIG. 2. In this illustrative example, assessment 902, assessment 904, assessment 906, assessment 908, assessment 910, and assessment 912 have been selected in pop-up menu 914. Pop-up menu 914 is displayed when control 916 is selected. In this example, the different assessments that may be selected are for forms that may be displayed for use in making the assessment.

With reference next to FIG. 10, an illustration of a test screen is depicted in accordance with an illustrative embodiment. Test screen 1000 is an example of a screen displayed in operation 606 in FIG. 6.

Test screen 1000 may be displayed to receive user input to identify information for the assessment. In this example, section 1002 is configured to receive a selection of a type of aircraft. Section 1004 is configured to receive a selection of a date for the assessment.

In this example, the assessment is performed in an actual aircraft instead of the simulator. This type of assessment may be referred to as a line check. In this illustrative example, a line check is a category of checks in which each check may have different nuances. Section 1006, section 1008, section 1010, section 1012, section 1014, and section 1016 are configured to be selected to identify the type of report that may be generated.

In this illustrative example, an annual line check is selected in section 1006. As a result, an annual line check report will be generated from the input by evaluator 102 in FIG. 2 during the assessment. One or more additional report types may be selected during an assessment, depending on the particular implementation.

Figure 11:
FIG. 11 is an illustration of a personnel screen in accordance with an illustrative embodiment.

With reference next to FIG. 11, an illustration of a personnel screen is depicted in accordance with an illustrative embodiment. In this particular example, personnel screen 1100 is an example of a personnel screen that may be displayed in operation 610 in FIG. 6.

In this particular example, information about personnel such as crew members and evaluators may be entered. For example, information about crew members may be entered in section 1101 and section 1102 in personnel screen 1100. An evaluator may be entered in section 1104 in personnel screen 1100. In this illustrative example, evaluator 102 may enter the information about each crew member in personnel screen 1100. In other illustrative examples, information about these crew members and evaluator 102 may be retrieved from a database such as personnel database 216 in FIG. 2.

For example, in section 1101, the name of the crew member may be entered in field 1106. An employee identifier may be entered in field 1108. An airline identifier may be entered in field 1110. The rank of the crew member may be selected in field 1112 and the location of the crew member in an aircraft may be selected in field 1114. Similar information may be entered in the fields shown in section 1102 and in section 1104 in this illustrative example.

Turning now to FIG. 12, an illustration of an information screen is depicted in accordance with an illustrative embodiment. In this depicted example, information screen 1200 is an example of a screen that may be displayed in operation 614 in FIG. 6.

As depicted, information screen 1200 identifies information for the assessment to be performed. In particular, information screen 1200 may be used by evaluator 102 in FIG. 1 to enter information for the assessment.

In this example, a selection of support for the crew member being assessed is identified in section 1202. A selection of the route flown for the assessment may be made in section 1204. The type of approaches for the route selected in section 1202 may be selected in section 1206.

Figure 13:
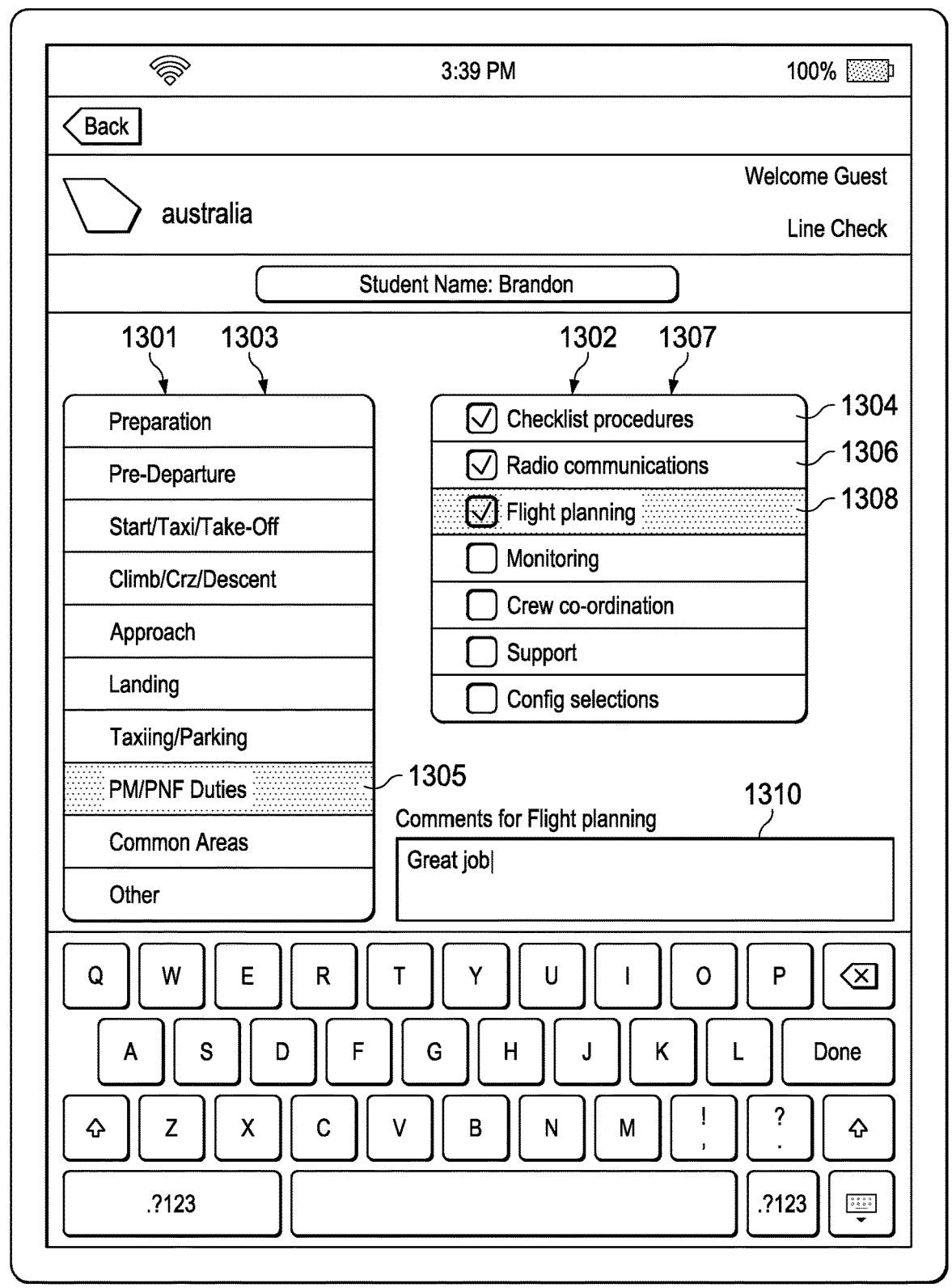
FIG. 13 is an illustration of a report screen in accordance with an illustrative embodiment.

Turning now to FIG. 13, an illustration of a report screen is depicted in accordance with an illustrative embodiment. In this example, report screen 1300 is an example of a screen that may be displayed in operation 618 in FIG. 6. In this example, report screen 1300 is displayed for the crew member defined in section 1102 in FIG. 11. In other illustrative examples, report screen 1300 may be displayed for the crew member defined by section 1101 or for other crew members whose information is entered in personnel screen 1100 in FIG. 11.

Report screen 1300 is configured to receive user input from evaluator 102 in FIG. 1 that identifies performance of the crew member during the assessment. In this depicted example, section 1301 in report screen 1300 shows list of categories 1303. Categories in list of categories 1303 may be phases of flight or other categories of assessment used by evaluator 102 to assess crew member performance. A category in list of categories 1303 may be selected during an assessment. For example, pilot monitoring/pilot not flying duties category 1305 is selected in this illustrative example. Evaluator 102 may select pilot monitoring/pilot duties not flying category 1305 to assess a crew member on the performance of tasks specific to pilot monitoring and pilot not flying scenarios.

In this illustrative example, section 1307 with list of items 1302 is shown in report screen 1300. Items in list of items 1302 may be tasks that are assessed during the assessment by evaluator 102.

In some illustrative examples, the number of tasks assessed by evaluator 102 may differ between assessments. For example, in this assessment, evaluator 102 selected checklist procedures 1304, radio communications 1306, and flight planning 1308 as being demonstrated by the crew member during an assessment. During other assessments, evaluator 102 may assess the same or different tasks in list of items 1302, depending on the particular implementation.

In these depicted examples, the crew member may receive a score for any tasks assessed by evaluator 102 in report screen 1300. This score may be a numeric score, a satisfactory/unsatisfactory delineation, or another type of score using some other suitable form of scoring.

As depicted, additional comments about the assessment may be entered into section 1310 of report screen 1300. For example, evaluator 102 may enter explanatory comments in section 1310 of report screen 1300. For instance, evaluator 102 may comment on the crew member's performance during a task. In another illustrative example, evaluator 102 may comment as to why a task was not completed, not assessed, or for some other suitable reason.

In some cases, the dynamics of flight may dictate which tasks may be assessed by evaluator 102. As a result, not all tasks listed in list of items 1302 may be performed during each assessment. In this manner, comments regarding assessed tasks, tasks that are not assessed, and other flight details may be entered into section 1310 of report screen 1300. The comments entered into report screen 1300 will be included in report 220 in FIG. 2.

Although the illustration of report screen 1300 is depicted including section 1301, section 1307, and section 1310, other sections in addition to or in place of section 1301, section 1307, and section 1310 may be implemented in report screen 1300. For example, an additional section may be implemented in report screen 1300 to aid evaluator 102 in assessing crew members.

For instance, in alternative implementations of an illustrative embodiment, a section may be shown in report screen 1300 that provides guidance for evaluator 102 in assessing different tasks in list of items 1302. When this type of section is used, evaluator 102 may view criteria for assessment for each task in list of items 1302 when that task is selected. In other words, criteria for assessment of a selected task may be displayed in a pop-up section in some illustrative examples. These criteria may be determined based on user preferences, Federal Aviation Administration guidelines, or based on other suitable standards, depending on the particular implementation. In this manner, an illustrative embodiment using report screen 1300 provides evaluator 102 with a uniform process for assessing, commenting, and recording the performance of a crew member during a particular set of tasks.

Figure 14:
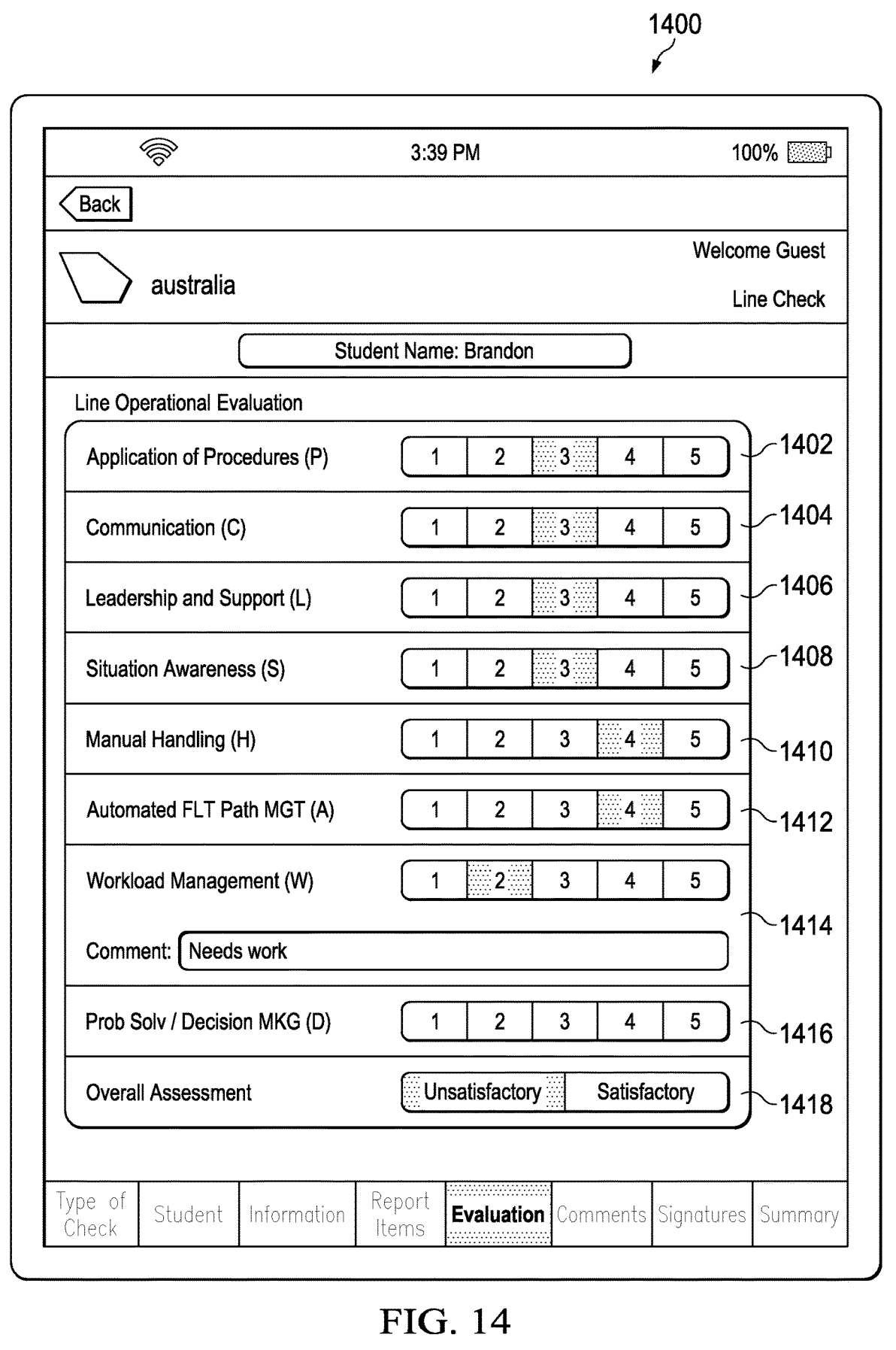

With reference next to FIG. 14, an illustration of an operation assessment screen is depicted in accordance with an illustrative embodiment. Assessment screen 1400 is an example of the screen that may be displayed in operation 622 in FIG. 6.

In this example, assessment screen 1400 may be used to evaluate the performance of a crew member performing different operations during an assessment of that crew member. The different items graded during the performance of a group of operations are found in section 1402, section 1404, section 1406, section 1408, section 1410, section 1412, section 1414, section 1416, and section 1418.

Figure 15:
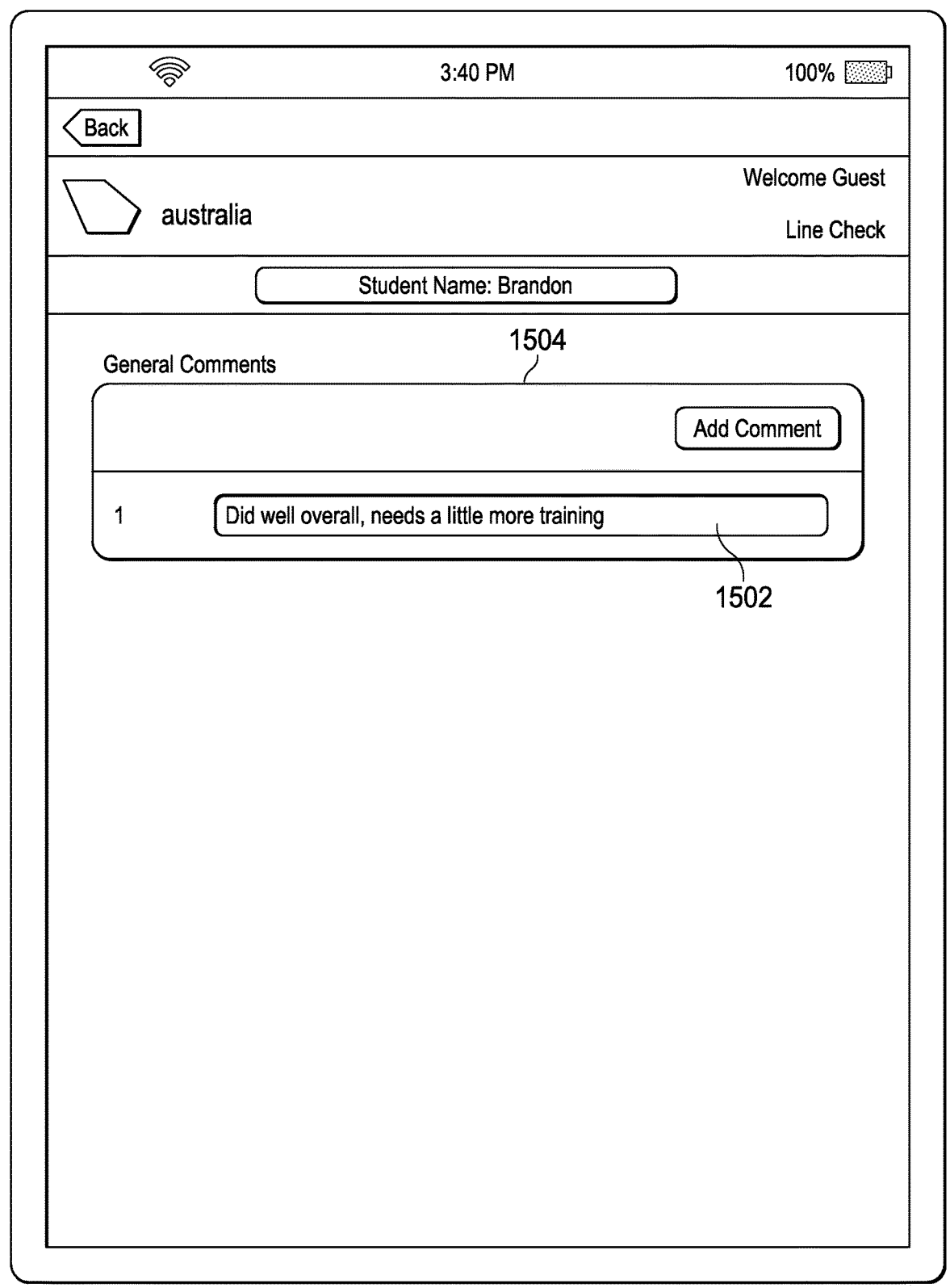
FIG. 15 is an illustration of a comment screen in accordance with an illustrative embodiment.

With reference now to FIG. 15, an illustration of a comment screen is depicted in accordance with an illustrative embodiment. In this illustrative example, comment screen 1500 is an example of a screen that may be displayed in operation 626.

In this particular example, comment screen 1500 is configured to receive additional input from evaluator 102 that may not be found in other screens in these illustrative examples. This additional input may be entered by evaluator 102 in field 1502 in section 1504.

Figure 16:
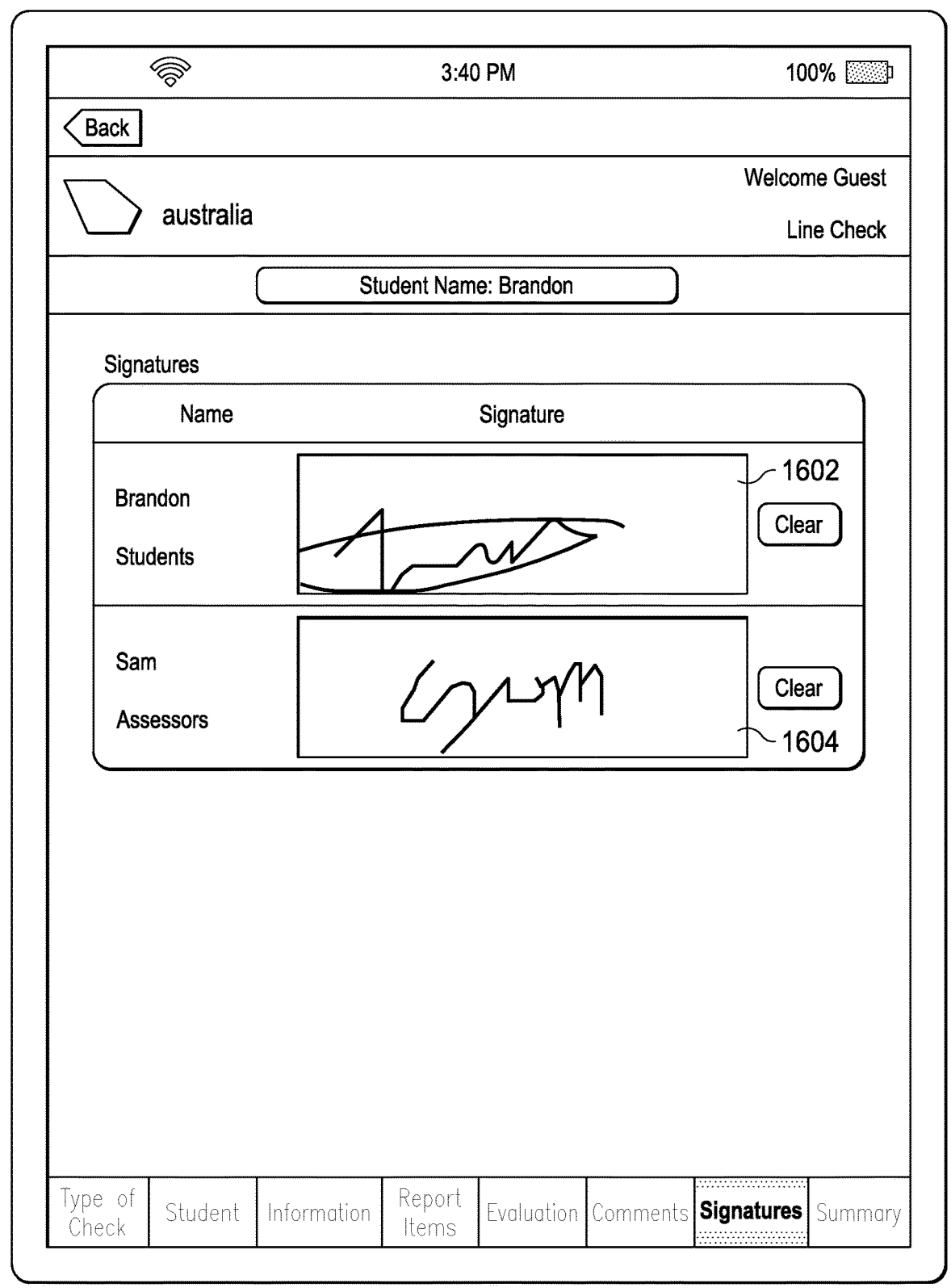
FIG. 16 is an illustration of a signature screen in accordance with an illustrative embodiment.

Turning now to FIG. 16, an illustration of a signature screen is depicted in accordance with an illustrative embodiment. In this example, signature screen 1600 may be displayed in operation 630 in FIG. 6.

As depicted, signature screen 1600 may be used to receive signatures from the number of crew members tested and the evaluator. In this example, a signature may be entered by the crew member in section 1602. The signature of evaluator 102 may be entered in section 1604.

With reference to FIG. 17, an illustration of a summary screen is depicted in accordance with an illustrative embodiment. In this depicted example, summary screen 1700 is an example of the screen that may be displayed in operation 634 in FIG. 6.

As depicted, summary screen 1700 provides a summary of the assessment made by evaluator 102. Further, the summary displayed in summary screen 1700, as well as other information from the assessment, may be sent in a report.

The illustrations of the different screens in FIGS. 9-17 are presented as examples of screens that may be displayed by flight assessor 200 in graphical user interface 207 on display system 206 to display information 114. These screens are only meant to be some illustrative examples of screens that may be displayed in graphical user interface 207 and are not meant to limit the manner in which flight assessor 200 may display information 114 in graphical user interface 207.

In these illustrative examples, evaluator 102 may use these screens in the order presented in FIGS. 9-17 to aid in a uniform assessment of crew members. Of course, evaluator 102 may also navigate the screens depicted in FIGS. 9-17 in any order, depending on the preferences of evaluator 102. In this manner, the process illustrated in FIG. 6 and the sequence of screens depicted in FIGS. 9-17 provide a uniform and easily useable assessment for evaluator 102.

Figure 18:
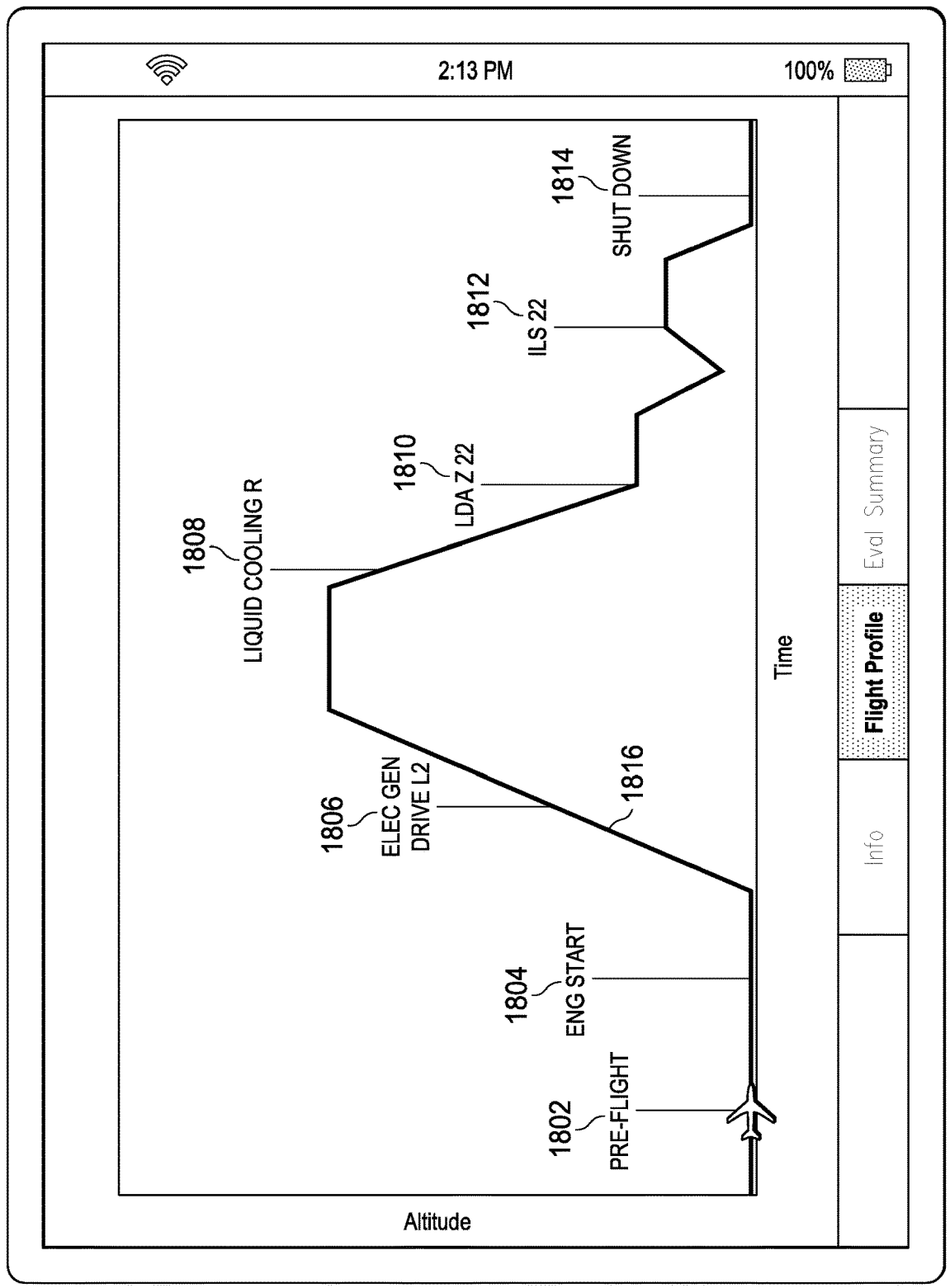
FIG. 18 is an illustration of another screen that may be displayed in a graphical user interface in accordance with an illustrative embodiment.

In FIG. 18, an illustration of another screen that may be displayed in a graphical user interface is depicted in accordance with an illustrative embodiment. In this example, information screen 1800 displays event 1802, event 1804, event 1806, event 1808, event 1810, event 1812, and event 1814 on flight profile 1816. In this illustrative example, flight profile 1816 is a vertical flight profile of the flight of an aircraft during which assessments are to be made for different events. These events are displayed in locations on flight profile 1816 to indicate when an assessment should be made for a task that is performed for a particular event.

Of course, in other illustrative examples, other types of flight profiles may be used. For example, a horizontal flight profile may be displayed instead of, or in addition to, the vertical flight profile shown in this example. The horizontal flight profile may show the route of the aircraft overlaid on an aeronautical chart. The aeronautical chart may show at least one of terrain, political features, air space boundaries, radio frequencies, and other suitable information. The events for which assessments are to be made may be displayed in the location where the events occur on the route.

With reference to FIG. 19, an illustration of a history screen is depicted in accordance with an illustrative embodiment. History screen 1900 may be displayed to provide the evaluator information about how a crew member performed in prior assessments made for particular events.

In this illustrative example, prior assessments are shown in section 1902, section 1904, section 1906, section 1908, section 1910, and section 1912. These sections provide information about scores in assessments made for tasks performed for events identified in information screen 1800. For example, section 1902 corresponds to event 1802 in FIG. 18; section 1904 corresponds to event 1804 in FIG. 18; section 1906 corresponds to event 1806 in FIG. 18; section 1908 corresponds to event 1808 in FIG. 18; section 1910 corresponds to event 1810 in FIG. 18; and section 1912 corresponds to event 1812 in FIG. 18.

Figure 20:
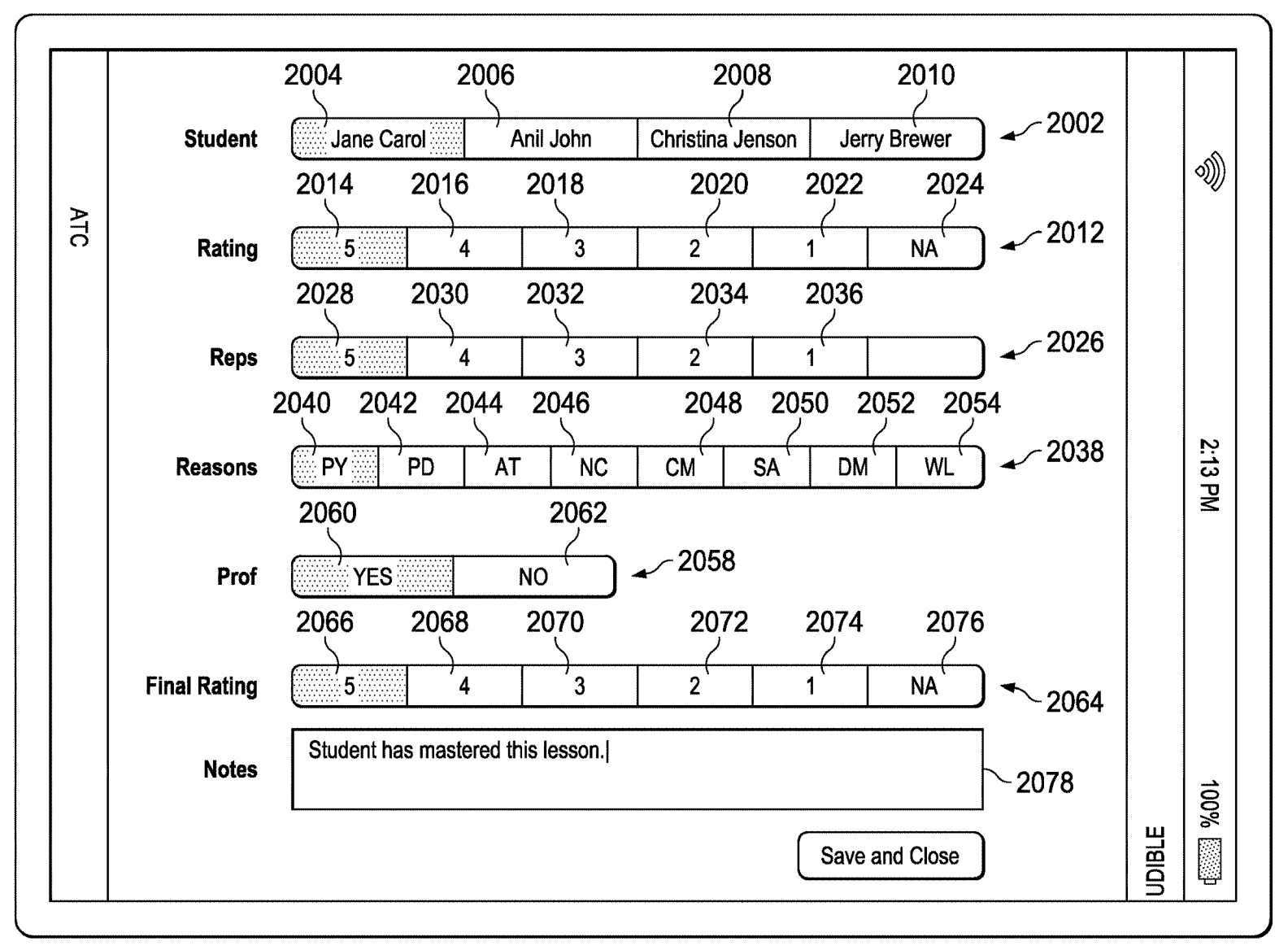

Turning now to FIG. 20, an illustration of an assessment screen is depicted in accordance with an illustrative embodiment. Assessment screen 2000 is another example of an assessment screen that may be displayed in operation 622 in FIG. 6. In this example, assessment screen 2000 displays standards for grading operations performed for a task when an event occurs.

In this example, crew members may be selected for assessment on section 2002. In this example, "Jane Carol" has been selected by selecting button 2004 in section 2002. Other crew members may be selected by selecting one of button 2006, button 2008, and button 2010 in section 2002.

A rating may be selecting in section 2012. The rating may be made for the performance of the operations for the task by selecting one of button 2014, button 2016, button 2018, button 2020, button 2022, and button 2024.

Section 2026 allows the evaluator to enter the number of repetitions made. For example, the evaluator may enter "5" because the crew member performed the task five times. The number of repetitions may be entered by selecting one of button 2028, button 2030, button 2032, button 2034, and button 2036.

Reasons for the rating may be entered in section 2038. The reasons here may be selected by selecting one of button 2040, button 2042, button 2044, button 2046, button 2048, button 2050, button 2052, and button 2054.

An evaluation of whether the crew member is proficient in performing the operations for the task in response to the event may be made in section 2058 by selecting one of button 2060 and button 2062.

A final rating may be entered in section 2064. The final rating may be made by selecting one of button 2066, button 2068, button 2070, button 2072, button 2074 and button 2076.

Further, the evaluator may also enter comments in section 2078. In this manner, the evaluator may enter more information that may be important to the assessment of the performance of the operations in the task.

As can be seen, the ratings and reasons in the different sections in assessment screen 2000 are fixed in a manner that result in more standardized assessment made by different evaluators that use this screen.

Figure 21:
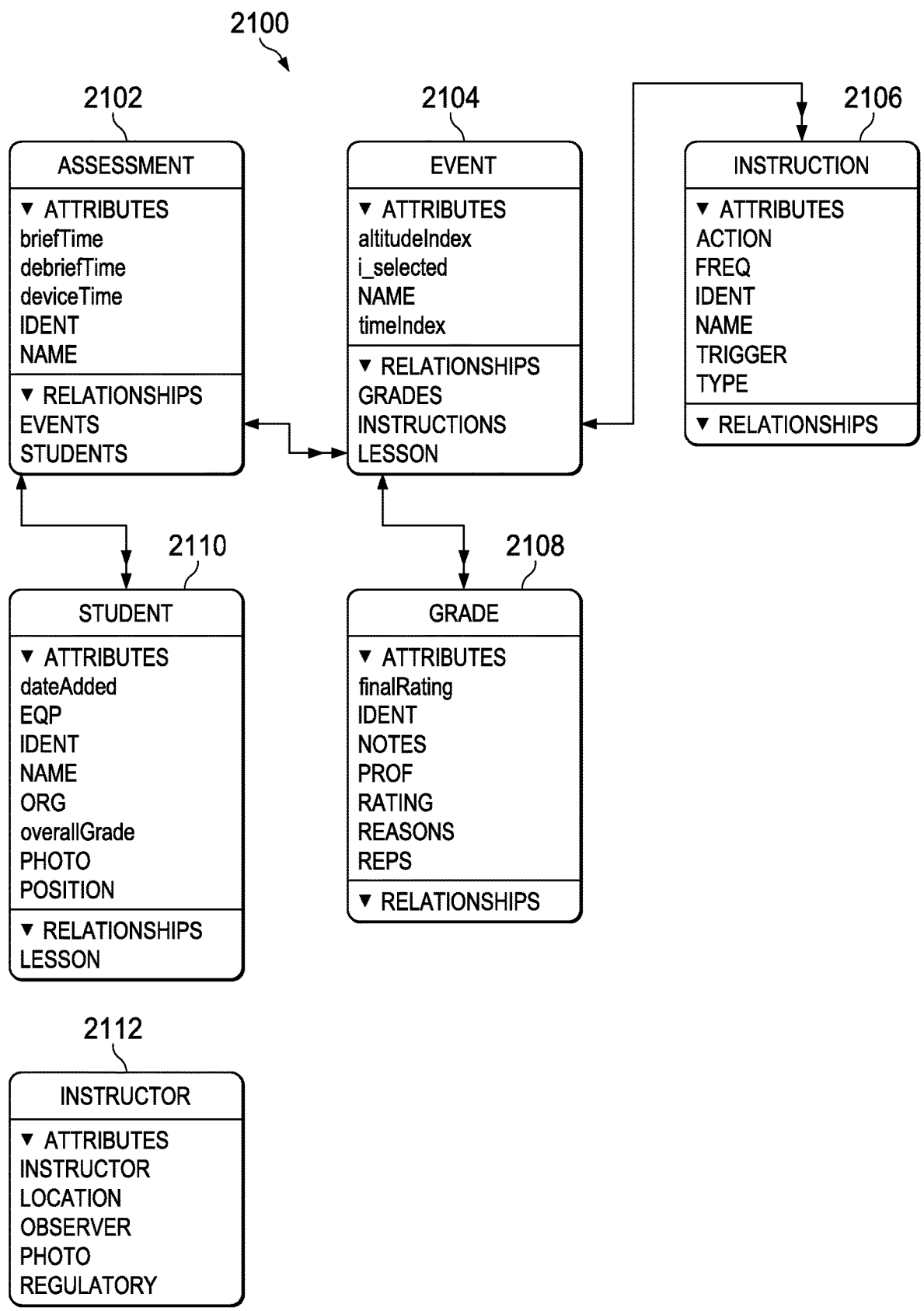
FIG. 21 is an illustration of a data structure in accordance with an illustrative embodiment.

With reference next to FIG. 21, an illustration of a data structure is depicted in accordance with an illustrative embodiment. In this example, data structure 2100 is an example of a data structure that may be used to send information 114 to flight assessor 200 in FIG. 2.

Data structure 2100 is an example of one manner in which data may be used to send information 114. In this example, data structure 2100 is depicted in the form of a unified modeling language (UML) diagram.

In this illustrative example, data structure 2100 includes different members. As depicted, data structure 2100 includes assessment 2102, event 2104, instruction 2106, grade 2108, student 2110, and instructor 2112.

Assessment 2102 is the parent entity of data structure 2100. Assessment 2102 may include information such as briefing time, debriefing time, identification, name, and device time. In these illustrative examples, the briefing time is the duration of the meeting between the evaluator and the student prior to the assessment. The student may be one of crew members 106 in FIG. 1.

In these depicted examples, the debriefing time is the duration of the meeting between the evaluator and the crew member after the assessment is complete. Identification is the type of assessment. Name is the name of the student being assessed and device time is the total amount of time spent in the simulator.

In the illustrative example, event 2104 includes altitude index, i_selected, name, and time index. This information is used to identify the event for which assessments may be made. Event 2104 is a subcategory of assessment 2102. In these illustrative examples, altitude index is the height at which event 2104 occurs. I_selected is the internal usage variable used such that the application knows which event is currently being assessed. Name is the name of event 2104. Time index is the time at which event 2104 occurs.

Instruction 2106 is a subcategory of event 2104. Instruction 2106 includes action, frequency, identifier, name, trigger, and type. In these illustrative examples, an action is a category indicating a specific action that the evaluator may perform in the simulator. Frequency is a frequency to use when communicating to the simulator. Identifier is an index of the row which determines order of the instructions for the event. Name is the title name of the instruction. Trigger is an action that causes the instruction to be performed. Type is the classification of the instruction type.

Grade 2108 is the rating of each of events 2104. Grade 2108 includes final rating, identifier, notes, prof, rating, reasons, and repetitions. In these illustrative examples, final rating corresponds to the final rating field in section 2064 of assessment screen 2000 in FIG. 20. Identifier is the identifier that correlates grade in grade 2108 to the student in student 2110 and in section 2002 of assessment screen 2000. Notes corresponds to the notes field in section 2078 of assessment screen 2000. Prof corresponds to the Prof field in section 2058 of assessment screen 2000. Rating corresponds to the rating field in section 2012 of assessment screen 2000. Reasons corresponds to the reason field in section 2038 of assessment screen 2000. Repetitions corresponds to the reps field in section 2026 of assessment screen 2000.

Student 2110 is the student being graded during the assessment. Student 2110 includes fields for date added, equipment, identifier, name, organization, overall grade, photo, and position. In these depicted examples, date added is the timestamp indicating when the student was added to the assessment. Equipment corresponds to the equipment field on the student form. Identifier correlates the student to assessment 2102. Name corresponds to the name field on the student form. Organization corresponds to the organization field on the student form. Overall grade corresponds to the score shown on the overall student record table for each assessment. Photo corresponds to the image of student 2110. Position corresponds to the position field on the student form.

Instructor 2112 is the person grading the students and running the application. Instructor 2112 may be an example of evaluator 102 in FIG. 1. Instructor 2112 includes instructor, location, observer, photo, and regulatory. As depicted, instructor is the name of the instructor. Location corresponds to the location field. Observer is the name of any other observer. Photo is an image of the instructor. Regulatory includes a name of any regulator observing the assessment.

As depicted, data structure 2100 may be implemented in a number of different ways. For example, data structure 2100 may be a flat file, a hypertext markup language (HTML) document, an extensible markup language (XLM) document, or some other suitable form. Further data structure 2100 may also include program code, scripts, or other elements that may be used by flight assessor 200 to display information 114 in graphical user interface 207 in FIG. 2.

Turning now to FIG. 22, an illustration of a block diagram of a data processing system is depicted in accordance with an illustrative embodiment. Data processing system 2200 may be used to implement data processing system 204 and computer system 202 in FIG. 2. In this illustrative example, data processing system 2200 includes communications framework 2202, which provides communications between processor unit 2204, memory 2206, persistent storage 2208, communications unit 2210, input/output (I/O) unit 2212, and display 2214. In this example, communication framework may take the form of a bus system.

Processor unit 2204 serves to execute instructions for software that may be loaded into memory 2206. Processor unit 2204 may be a number of processors, a multi-processor core, or some other type of processor, depending on the particular implementation.

Memory 2206 and persistent storage 2208 are examples of storage devices 2216. A storage device is any piece of hardware that is capable of storing information, such as, for example, without limitation, data, program code in functional form, and/or other suitable information either on a temporary basis and/or a permanent basis. Storage devices 2216 may also be referred to as computer readable storage devices in these illustrative examples. Memory 2206, in these examples, may be, for example, a random access memory or any other suitable volatile or non-volatile storage device. Persistent storage 2208 may take various forms, depending on the particular implementation.

For example, persistent storage 2208 may contain one or more components or devices. For example, persistent storage 2208 may be a hard drive, a flash memory, a rewritable optical disk, a rewritable magnetic tape, or some combination of the above. The media used by persistent storage 2208 also may be removable. For example, a removable hard drive may be used for persistent storage 2208.

Communications unit 2210, in these illustrative examples, provides for communications with other data processing systems or devices. In these illustrative examples, communications unit 2210 is a network interface card.

Input/output unit 2212 allows for input and output of data with other devices that may be connected to data processing system 2200. For example, input/output unit 2212 may provide a connection for user input through a keyboard, a mouse, and/or some other suitable input device. Further, input/output unit 2212 may send output to a printer. Display 2214 provides a mechanism to display information to a user.

Instructions for the operating system, applications, and/or programs may be located in storage devices 2216, which are in communication with processor unit 2204 through communications framework 2202. The processes of the different embodiments may be performed by processor unit 2204 using computer-implemented instructions, which may be located in a memory, such as memory 2206.

These instructions are referred to as program code, computer usable program code, or computer readable program code that may be read and executed by a processor in processor unit 2204. The program code in the different embodiments may be embodied on different physical or computer readable storage media, such as memory 2206 or persistent storage 2208.

Program code 2218 is located in a functional form on computer readable media 2220 that is selectively removable and may be loaded onto or transferred to data processing system 2200 for execution by processor unit 2204. Program code 2218 and computer readable media 2220 form computer program product 2222 in these illustrative examples. In one example, computer readable media 2220 may be computer readable storage media 2224 or computer readable signal media 2226.

In these illustrative examples, computer readable storage media 2224 is a physical or tangible storage device used to store program code 2218 rather than a medium that propagates or transmits program code 2218.

Alternatively, program code 2218 may be transferred to data processing system 2200 using computer readable signal media 2226. Computer readable signal media 2226 may be, for example, a propagated data signal containing program code 2218. For example, computer readable signal media 2226 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 2200 are not meant to provide architectural limitations to the manner in which different embodiments may be implemented. The different illustrative embodiments may be implemented in a data processing system including components in addition to and/or in place of those illustrated for data processing system 2200. Other components shown in FIG. 22 can be varied from the illustrative examples shown. The different embodiments may be implemented using any hardware device or system capable of running program code 2218.

Thus, the illustrative embodiments provide a method and apparatus for assessing performance of crew members for an aircraft. With one or more illustrative embodiments, an evaluator may use a mobile data processing system, such as a mobile phone for tablet computer, to perform an assessment of that crew member, such as a pilot.

With the use of a flight assessor in the mobile data processing system, an evaluator may assess the performance of a pilot in real time during a simulation or during actual flight. The flight assessor in the different illustrative examples may provide a guide for a desired assessment for operations performed for a specific event. The use of a flight assessor also may provide guidance for grading the performance of the operations. In this manner, the same guidance may be used for assessments performed at different times by different evaluators. As a result, an increase in the standardization of results from assessments of crew members may occur.

Additionally, with the use of the flight assessor in these illustrative examples, the amount of time and effort needed to perform assessments may be reduced. With the flight assessor, the need for paper-based grading and grading operations after they have been performed may be reduced or eliminated.

Additionally, the summary generated by the flight assessor may be used for a number of different purposes. For example, the summary may be used for debriefing of the crew members, used as a record for regulatory purposes, and for other uses.

The description of the different illustrative embodiments has been presented for purposes of illustration and description, and is not intended to be exhaustive or limited to the embodiments in the form disclosed. Many modifications and variations will be apparent to those of ordinary skill in the art.

Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus, configured to improve operation of an aircraft, that comprises:
   a flight assessment system that comprises: a display system and an input system on the aircraft, a flight assessor, and an assessment manager;
   the assessment manager specially programmed, responsive to an update received in one of:
   an assessment database or a personnel database, to push a code update, unsolicited by the flight assessor, to the flight assessor; and
   the flight assessor configured to:
     send, during operation of the aircraft, by a number of crew members of the aircraft for which a group of operations is assessed, information for assessing a performance, of the number of crew members, to the display system;
     receive an input, from the input system, associated with the information for assessing the performance by the number of crew members; and
     receive, from the assessment manager the code update during an assessment that dynamically replaces a first form with a second form while the first form is in use on the display system, such that, in operation, the flight assessor:
       sends the information to the display system, during operation of the aircraft by the number of crew members;
       receives the input, associated with the information for the performance, of the group of operations, by the number of crew members; and
       receives, from the assessment manager the code update during the assessment that dynamically replaces a first form with a second form while the first form is in use on the display system.

2. The apparatus of claim 1, further comprising the flight assessor configured to:
   store the input and generate a report, on the performance of the group of operations performed by the number of crew members using the input, and
   receive the information from the assessment manager without requesting the information, such that, in operation, the flight assessor:
     stores the input and generates the report, on the performance of the group of operations performed by the number of crew members using the input, and
     receives the information from the assessment manager without requesting the information.

3. The apparatus of claim 1, wherein the group of operations comprises a task performed in response to an event selected from at least one of: a preflight check, an engine start, the aircraft moving away from a gate, aircraft taxi, a takeoff, a descent, a landing, an engine shutdown, a turbulence encounter, a turbulence warning, an undesired performance of an engine on the aircraft, and the code update during the assessment comprises a movement of all data entered into a first form being moved to update the second form.

4. The apparatus of claim 1, wherein the flight assessor is further configured to send a report based on the input to an entity over a communications link, such that, in operation, the flight assessor sends the report based on the input to the entity over the communications link.

5. The apparatus of claim 1, wherein the flight assessor is further configured to receive the code update, for assessing the performance of the group of operations performed by the number of crew members, from a computer system over a communications link, such that, in operation, the flight assessor receives the code update, for assessing the performance of the group of operations performed by the number of crew members, from the computer system over the communications link.

6. The apparatus of claim 1, wherein the flight assessor is configured to receive the input, during the performance of the group of operations by the number of crew members, for an event, such that, in operation, the flight assessor receives the input, during the performance of the group of operations by the number of crew members, for the event.

7. The apparatus of claim 1, wherein the display system, the input system, and the flight assessor are located in a data processing system, and the code update comprises an update to a form, and comprises coding that places an indication on the display system of at least one of: differences, and similarities, between the form, and the update to the form.

8. The apparatus of claim 7, wherein the data processing system is selected from one of a tablet computer, an electronic flight bag, a mobile phone, and a laptop computer.

9. The apparatus of claim 1, wherein the operation of the aircraft is performed using at least one of: the aircraft, and a simulator for the aircraft, and the information sent by the flight assessor comprises screens displayed on the display system in a particular order that aids a uniform assessment of the number of crew members.

10. The apparatus of claim 1, wherein the display system and the input system take a form of a touchscreen device, the touchscreen device being configured to display a profile of a flight of the aircraft, such that the profile comprises a display of events along the profile, such that events along the profile occur responsive to an action that triggers an instruction, such that, in operation, a touchscreen displays the profile of the flight such that the profile comprises the display of the events along the profile, such that the events along the profile occur responsive to the action that triggers the instruction.

11. A method for minimizing error in assessing performance operating an aircraft, the method comprising:
 a flight assessment manager specially programmed for, responsive to receiving an update in one of: an assessment database or a personnel database, pushing a code update, unsolicited by a flight assessor in a data processing system on the aircraft, to the to the flight assessor during an assessment of performance operating the aircraft and dynamically replacing a first form with a second form while the first form is in use by the flight assessor;
 receiving, on a graphical interface from the flight assessor, from a computer system over a communications link, at least one of: prior to, and during, the assessment, information for assessing a performance of a group of operations performed by a number of crew members;
 displaying the information on a display system, during operation of the aircraft by the number of crew members for which the group of operations is assessed;
 receiving user input, assessing the performance of the group of operations by the number of crew members, through an input system;
 storing the user input; and
 generating a report on the performance of the group of operations performed by the number of crew members using the user input.

12. The method of claim 11, wherein the displaying step comprises:
 displaying the information in a graphical user interface in the display system for a portable data processing system, wherein the information is for assessing the performance of the group of operations performed by the number of crew members of the aircraft on the display system during operation of the aircraft by the number of crew members for which the group of operations is assessed.

13. The method of claim 11, wherein the displaying step comprises:
 displaying grading criteria, for assessing the performance of the group of operations performed by the number of crew members, on screens displayed on the display system in a particular order that aids a uniform assessment of the number of crew members.

14. The method of claim 11, wherein the group of operations is for a task performed in response to an event selected from at least one of: a preflight check, an engine start, the aircraft moving away from a gate, aircraft taxi, a takeoff, a descent, a landing, an engine shutdown, a turbulence encounter, a turbulence warning, an undesired performance of an engine on the aircraft, and displaying the task in a profile of a flight displayed on the display system, such that the profile of the flight comprises a display comprising the event located along the profile of the flight.

15. The method of claim 11 further comprising:
 receiving, at least one of: prior to, and during, the assessment of performance operating the aircraft, in the flight assessor at least one of: prior to, and during, the assessment of performance operating the aircraft, the code update for assessing the performance, of the group of operations performed by the number of crew members, from the computer system over the communications link, such that the code update indicates at least one of: differences, and similarities, between the information and the update to the information.

16. The method of claim 11, wherein the user input is received during performance of the group of operations by the number of crew members for an event.

17. The method of claim 11, wherein the display system and the input system are located in the data processing system selected from one of a tablet computer, an electronic flight bag, a mobile phone, and a laptop computer.

18. The method of claim 11, wherein the operation of the aircraft is performed using at least one of the aircraft and a simulator for the aircraft.

19. A flight assessment system, configured to improve operation of an aircraft, that comprises:
 an assessment manager specially, responsive to an update received in one of: an assessment database or a personnel database, to push a code update, unsolicited by a flight assessor on the aircraft, to the flight assessor configured for use during a performance, of a group of operations performed by a number of crew members; and the flight assessor configured to;
- receive the code update and information from the assessment manager during the performance and dynamically replace a first form with a second form while the first form is in use by the flight assessor and a display system associated with the flight assessor;
- display, based upon the code update, the information for assessing the performance, of the group of operations performed by the number of crew members of the aircraft, on the display system associated with the flight assessor, during operation of the aircraft by the number of crew members for which the group of operations is assessed; and
- receive, from an input system, user input assessing the performance, of the group of operations by the number of crew members.

20. The flight assessment system of claim 19, further comprising the assessment manager configured to send the second form to dynamically replace the first form on the flight assessor with the second form, such that the flight assessor indicates on the display system associated with the flight assessor at least one of: differences, and similarities, between the first form and the second form, such that, in operation, the assessment manager sends the second form and dynamically replaces the first form, while it is displayed on the display system associated with the flight assessor, with the second form, such that the flight assessor indicates on the display system associated with the flight assessor at least one of: differences, and similarities, between the first form and the second form.

* * * * *